United States Patent
Johnsen et al.

(10) Patent No.: US 12,470,623 B2
(45) Date of Patent: *Nov. 11, 2025

(54) SYSTEM AND METHOD FOR SUPPORTING HETEROGENEOUS AND ASYMMETRIC DUAL RAIL FABRIC CONFIGURATIONS IN A HIGH PERFORMANCE COMPUTING ENVIRONMENT

(71) Applicant: ORACLE INTERNATIONAL CORPORATION, Redwood Shores, CA (US)

(72) Inventors: Bjørn Dag Johnsen, Oslo (NO); Predrag Hodoba, Oslo (NO); Line Holen, Oslo (NO); Kurt Tjemsland, Bryne (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 17/729,847

(22) Filed: Apr. 26, 2022

(65) Prior Publication Data
US 2022/0263892 A1   Aug. 18, 2022

Related U.S. Application Data

(63) Continuation of application No. 16/547,329, filed on Aug. 21, 2019, now Pat. No. 11,336,716, which is a
(Continued)

(51) Int. Cl.
*H04L 67/1008* (2022.01)
*H04L 47/20* (2022.01)
(Continued)

(52) U.S. Cl.
CPC .......... *H04L 67/1008* (2013.01); *H04L 47/20* (2013.01); *H04L 49/358* (2013.01); *H04L 67/1097* (2013.01)

(58) Field of Classification Search
CPC . H04L 67/1008; H04L 67/1097; H04L 47/20; H04L 49/358
See application file for complete search history.

(56) References Cited

U.S. PATENT DOCUMENTS

| 7,447,197 B2 | 11/2008 | Terrell |
| 7,991,006 B2 | 8/2011 | Reiss |

(Continued)

FOREIGN PATENT DOCUMENTS

| CN | 107710159 | 2/2018 |
| CN | 108701110 | 10/2018 |

(Continued)

OTHER PUBLICATIONS

China National Intellectual Property Administration, Notification of the First Office Action dated Jan. 26, 2024 for Chinese Patent Application No. 202080006163.4 , 6 pages.
(Continued)

*Primary Examiner* — Charles C Jiang
*Assistant Examiner* — Ryan C Kavleski
(74) *Attorney, Agent, or Firm* — TUCKER ELLIS LLP

(57) ABSTRACT

Systems and methods for supporting heterogeneous and asymmetric dual rail fabric configurations in a high performance computing environment. A method can provide, comprising at one or more computers each including one or more microprocessors, a plurality hosts, each of the plurality of hosts comprising at least one dual port adapter, a private fabric, the private fabric comprising two or more switches, and a public fabric, the public fabric comprising a cloud fabric. A workload can be provisioned at a host of the
(Continued)

plurality of hosts. A placement policy can be assigned to the provisioned workload. Then, network traffic between peer nodes of the provisioned workload can be assigned to one or more of the private fabric and the public fabric in accordance with the placement policy.

20 Claims, 25 Drawing Sheets

Related U.S. Application Data continuation-in-part of application No. 16/267,072, filed on Feb. 4, 2019, now Pat. No. 10,992,538, and a continuation-in-part of application No. 16/261,362, filed on Jan. 29, 2019, now Pat. No. 11,102,108, said application No. 16/267,072 is a continuation-in-part of application No. 16/115,138, filed on Aug. 28, 2018, now Pat. No. 11,070,394, said application No. 16/547,329 is a continuation-in-part of application No. 16/115,138, filed on Aug. 28, 2018, now Pat. No. 11,070,394, said application No. 16/261,362 is a continuation-in-part of application No. 16/115,138, filed on Aug. 28, 2018, now Pat. No. 11,070,394.

(60) Provisional application No. 62/679,478, filed on Jun. 1, 2018, provisional application No. 62/679,465, filed on Jun. 1, 2018, provisional application No. 62/679,469, filed on Jun. 1, 2018, provisional application No. 62/552,818, filed on Aug. 31, 2017.

(51) Int. Cl.
*H04L 49/356* (2022.01)
*H04L 67/1097* (2022.01)

(56) References Cited

U.S. PATENT DOCUMENTS

| | | | |
|---|---|---|---|
| 8,266,204 | B2 | 9/2012 | Bansal |
| 8,639,870 | B2 | 1/2014 | Hostetter |
| 9,967,288 | B2 | 5/2018 | Hugenbruch |
| 10,135,947 | B1 | 11/2018 | Chen |
| 10,616,118 | B2 | 4/2020 | Johnsen |
| 10,810,316 | B2 | 10/2020 | Gordon |
| 10,992,538 | B2 | 4/2021 | Johnsen |
| 11,005,736 | B2 | 5/2021 | Abley |
| 11,070,394 | B2 | 7/2021 | Johnsen |
| 11,102,108 | B2 | 8/2021 | Johnsen |
| 11,336,716 | B2 | 5/2022 | Johnsen |
| 11,356,327 | B2 | 6/2022 | Johnsen |
| 11,411,860 | B2 | 8/2022 | Johnsen |
| 2003/0005039 | A1 | 1/2003 | Craddock |
| 2004/0267945 | A1 | 12/2004 | Reiss |
| 2005/0232285 | A1 | 10/2005 | Terrell |
| 2006/0176804 | A1 | 8/2006 | Shibata |
| 2006/0274752 | A1* | 12/2006 | Jain ................... H04L 61/103 370/392 |
| 2008/0031130 | A1 | 2/2008 | Raj |
| 2008/0267078 | A1 | 10/2008 | Farinacci |
| 2009/0201803 | A1 | 8/2009 | Filsfils |
| 2009/0213753 | A1 | 8/2009 | Burrow |
| 2009/0216901 | A1 | 8/2009 | Schloming |
| 2009/0245248 | A1 | 10/2009 | Arberg |
| 2010/0070558 | A1 | 3/2010 | Miura |
| 2011/0225231 | A1 | 9/2011 | Bansal |
| 2012/0182639 | A1 | 7/2012 | Hostettter |
| 2014/0211614 | A1 | 7/2014 | Winn |
| 2015/0098466 | A1 | 4/2015 | Haramaty |
| 2015/0324215 | A1* | 11/2015 | Borthakur ............ G06F 9/45558 718/1 |
| 2016/0330108 | A1 | 11/2016 | Gillon |
| 2017/0099188 | A1* | 4/2017 | Chang ................. H04L 12/4633 |
| 2017/0134426 | A1 | 5/2017 | Hugenbruch |
| 2017/0324665 | A1 | 11/2017 | Johnsen |
| 2017/0353382 | A1 | 12/2017 | Gupta |
| 2018/0278491 | A1 | 9/2018 | Johnsen |
| 2018/0309662 | A1 | 10/2018 | Clarke |
| 2018/0330107 | A1 | 11/2018 | Gordon |
| 2018/0375833 | A1* | 12/2018 | Hristov .................. H04L 63/10 |
| 2019/0028400 | A1 | 1/2019 | Kommula |
| 2019/0280948 | A1 | 9/2019 | Abley |
| 2019/0379582 | A1 | 12/2019 | Johnsen |
| 2019/0379598 | A1 | 12/2019 | Johnsen |
| 2021/0226851 | A1 | 7/2021 | Johnsen |
| 2021/0359933 | A1 | 11/2021 | Johnsen |
| 2022/0263892 | A1 | 8/2022 | Johnsen |

FOREIGN PATENT DOCUMENTS

| | | |
|---|---|---|
| JP | 2014147066 | 8/2014 |
| TW | 478266 | 3/2002 |

OTHER PUBLICATIONS

Oberg, et al., "A system architecture supporting high-performance and cloud computing in an academic consortium environment", Computer Science—Research and Development, vol. 26, No. 3-4, pp. 317-324, published May 6, 2011, 8 pages.
Bach, Martin; "Expert Oracle Exadata", p. 545, 2015, 1 page.
Japan Patent Office, Notice of Reasons for Refusal dated Dec. 7, 2023 for Japanese Patent Application No. 2021-541636 , 8 pages.
Intellectual Property India, Examination Report under sections 12 & 13 of the Patents Act, 1970 and the Patents Rules, 2003 dated May 1, 2023 for India Patent Application No. 202147014863 , 7 pages.
European Patent Office, Communication pursuant to Article 94(3) EPC dated May 4, 2023 for European Patent Application No. 20708818.8 , 10 pages.
Japan Patent Office, Notice of Reasons for Refusal dated Mar. 18, 2025 for Japanese Patent Application No. 2024-074366 , 9 pages.

* cited by examiner

1310 — Provide, at one or more computers, including one or more microprocessors, a first subnet, the first subnet comprising one or more switches, the one or more switches comprising at least a leaf switch, wherein each of the one or more switches comprise a plurality of switch ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the one or more switches and the plurality of host channel adapters.

1320 — Configure a switch port of the plurality of switch ports on a switch of the one or more switches as a router port.

1330 — Logically connect the switch port configured as the router port is to a virtual router, the virtual router comprising at least two virtual router ports.

FIGURE 13

SYSTEM AND METHOD FOR SUPPORTING HETEROGENEOUS AND ASYMMETRIC DUAL RAIL FABRIC CONFIGURATIONS IN A HIGH PERFORMANCE COMPUTING ENVIRONMENT

CLAIM OF PRIORITY

This application is a continuation of U.S. patent application entitled "SYSTEM AND METHOD FOR SUPPORTING HETEROGENEOUS AND ASYMMETRIC DUAL RAIL FABRIC CONFIGURATIONS IN A HIGH PERFORMANCE COMPUTING ENVIRONMENT", application Ser. No. 16/547,329, filed Aug. 21, 2019; which application Ser. No. 16/547,329 is a continuation-in-part of U.S. patent application entitled "SYSTEM AND METHOD FOR REDUNDANT INDEPENDENT NETWORKS IN A HIGH PERFORMANCE COMPUTING ENVIRONMENT", application Ser. No. 16/115,138, filed Aug. 28, 2018, and subsequently issued as U.S. Pat. No. 11,070,394 on Jul. 20, 2021, which claims the benefit of priority to U.S. Provisional Patent application entitled "SYSTEM AND METHOD FOR A RAIL NUMBER ASSOCIATION FOR CORRECT CONNECTIVITY IN A HIGH PERFORMANCE COMPUTING ENVIRONMENT", Application No. 62/679,465, filed on Jun. 1, 2018; and U.S. Provisional patent application entitled "SYSTEM AND METHOD FOR A REDUNDANT INDEPENDENT NETWORK IN A HIGH PERFORMANCE COMPUTING ENVIRONMENT", Application No. 62/552,818, filed on Aug. 31, 2017; which application Ser. No. 16/547,329 is also a continuation-in-part of U.S. patent application entitled "SYSTEM AND METHOD FOR USING INFINIBAND ROUTING ALGORITHMS FOR ETHERNET FABRICS IN A HIGH PERFORMANCE COMPUTING ENVIRONMENT", application Ser. No. 16/267,072, filed Feb. 4, 2019, and subsequently issued as U.S. Pat. No. 10,992,538 on Apr. 27, 2021, which application claims the benefit of priority to U.S. Provisional patent application entitled "SYSTEM AND METHOD FOR USING INFINIBAND ROUTING ALGORITHMS FOR ETHERNET FABRICS IN A HIGH PERFORMANCE COMPUTING ENVIRONMENT", Application No. 62/679,469, filed on Jun. 1, 2018; which application Ser. No. 16/267,072 is also a continuation-in-part of U.S. patent application Ser. No. 16/115,138, filed Aug. 28, 2018, which claims the benefit of priority to U.S. Provisional Patent Application No. 62/679,465, filed on Jun. 1, 2018, and U.S. Provisional Patent Application No. 62/552,818, filed on Aug. 31, 2017; which application Ser. No. 16/547,329 is also a continuation-in-part of U.S. patent application entitled "SYSTEM AND METHOD FOR A MULTICAST SEND DUPLICATION INSTEAD OF REPLICATION IN A HIGH PERFORMANCE COMPUTING ENVIRONMENT", application Ser. No. 16/261,362, filed Jan. 29, 2019, and subsequently issued as U.S. Pat. No. 11,102,108 on Aug. 24, 2021, which application claims the benefit of priority to U.S. Provisional patent application entitled "SYSTEM AND METHOD FOR A MULTICAST SEND DUPLICATION INSTEAD OF REPLICATION IN A HIGH PERFORMANCE COMPUTING ENVIRONMENT", Application No. 62/679,478, filed on Jun. 1, 2018; which application Ser. No. 16/261,362 is also a continuation-in-part of U.S. patent application Ser. No. 16/115,138, filed Aug. 28, 2018, which claims the benefit of priority to U.S. Provisional Patent Application No. 62/679,465, filed on Jun. 1, 2018, and U.S. Provisional Patent Application No. 62/552,818, filed on Aug. 31, 2017; and is related to U.S. patent application entitled "SYSTEM AND METHOD FOR ON-DEMAND UNICAST FORWARDING IN A HIGH PERFORMANCE COMPUTING ENVIRONMENT", application Ser. No. 16/547,332, filed on Aug. 21, 2019, and U.S. patent application entitled "SYSTEM AND METHOD FOR A SINGLE LOGICAL IP SUBNET ACROSS MULTIPLE INDEPENDENT LAYER 2 (L2) SUBNETS IN A HIGH PERFORMANCE COMPUTING ENVIRONMENT", application Ser. No. 16,547,335, filed Aug. 21, 2019; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As larger cloud computing architectures are introduced, the performance and administrative bottlenecks associated with the traditional network and storage have become a significant problem. There has been an increased interest in using high performance interconnects such as InfiniBand (IB) and RoCE (RDMA (remote direct memory access) over Converged Ethernet) technology as the foundation for a cloud computing fabric. This is the general area that embodiments of the invention are intended to address.

SUMMARY

Systems and methods for supporting heterogeneous and asymmetric dual rail fabric configurations in a high performance computing environment. A method can provide, comprising at one or more computers each including one or more microprocessors, a plurality hosts, each of the plurality of hosts comprising at least one dual port adapter, a private fabric, the private fabric comprising two or more switches, and a public fabric, the public fabric comprising a cloud fabric. A workload can be provisioned at a host of the plurality of hosts. A placement policy can be assigned to the provisioned workload. Then, network traffic between peer nodes of the provisioned workload can be assigned to one or more of the private fabric and the public fabric in accordance with the placement policy.

BRIEF DESCRIPTION OF THE FIGURES

FIG. 13 shows a flowchart of a method for supporting dual-port virtual router in a high performance computing environment, in accordance with an embodiment.

DETAILED DESCRIPTION

Figure 1:
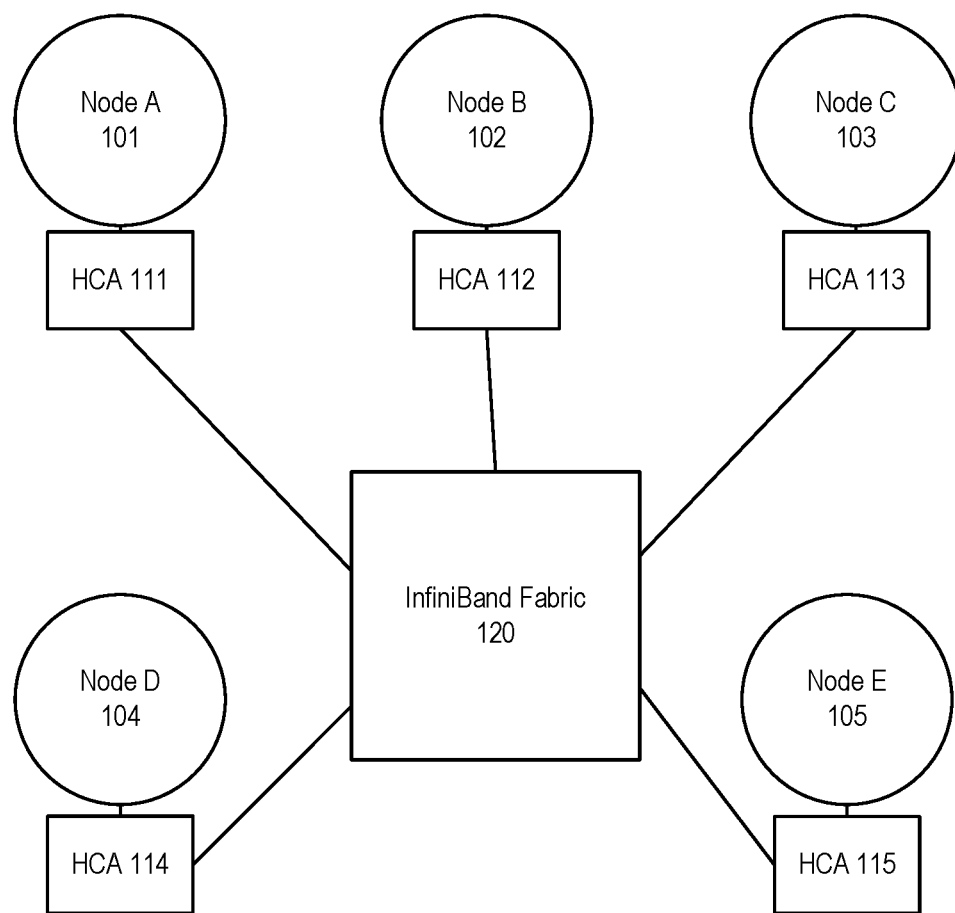
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

In accordance with an embodiment, described herein are systems and methods for supporting a heterogeneous and asymmetric dual-rail fabric configuration in a high performance computing environment.

In some embodiments, the following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In some other embodiments, the following description uses a RoCE (RDMA (Remote Direct Memory Access) over Converged Ethernet). RDMA over Converged Ethernet (RoCE) is a standard protocol which enables RDMA's efficient data transfer over Ethernet networks allowing transport offload with hardware RDMA engine implementation, and superior performance. RoCE is a standard protocol defined in the InfiniBand Trade Association (IBTA) standard. RoCE makes use of UDP (user datagram protocol) encapsulation allowing it to transcend Layer 3 networks. RDMA is a key capability natively used by the InfiniBand interconnect technology. Both InfiniBand and Ethernet RoCE share a common user API but have different physical and link layers.

In accordance with an embodiment, although portions of the specification contain reference to, in describing various implementations, an InfiniBand Fabric, one of ordinary skill in the art would readily understand that the various embodiments described herein can also be implemented in a RoCE Fabric.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
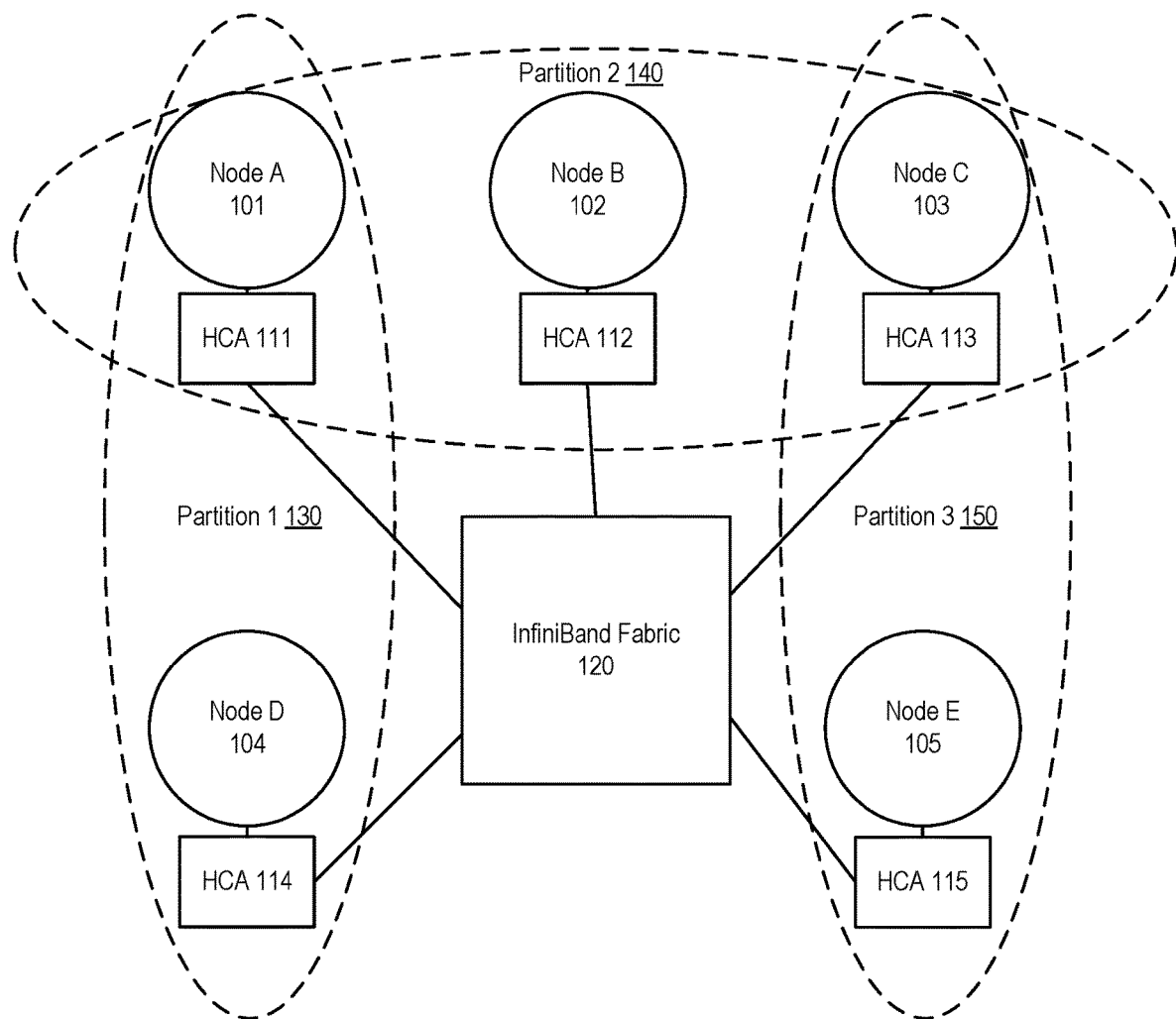
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
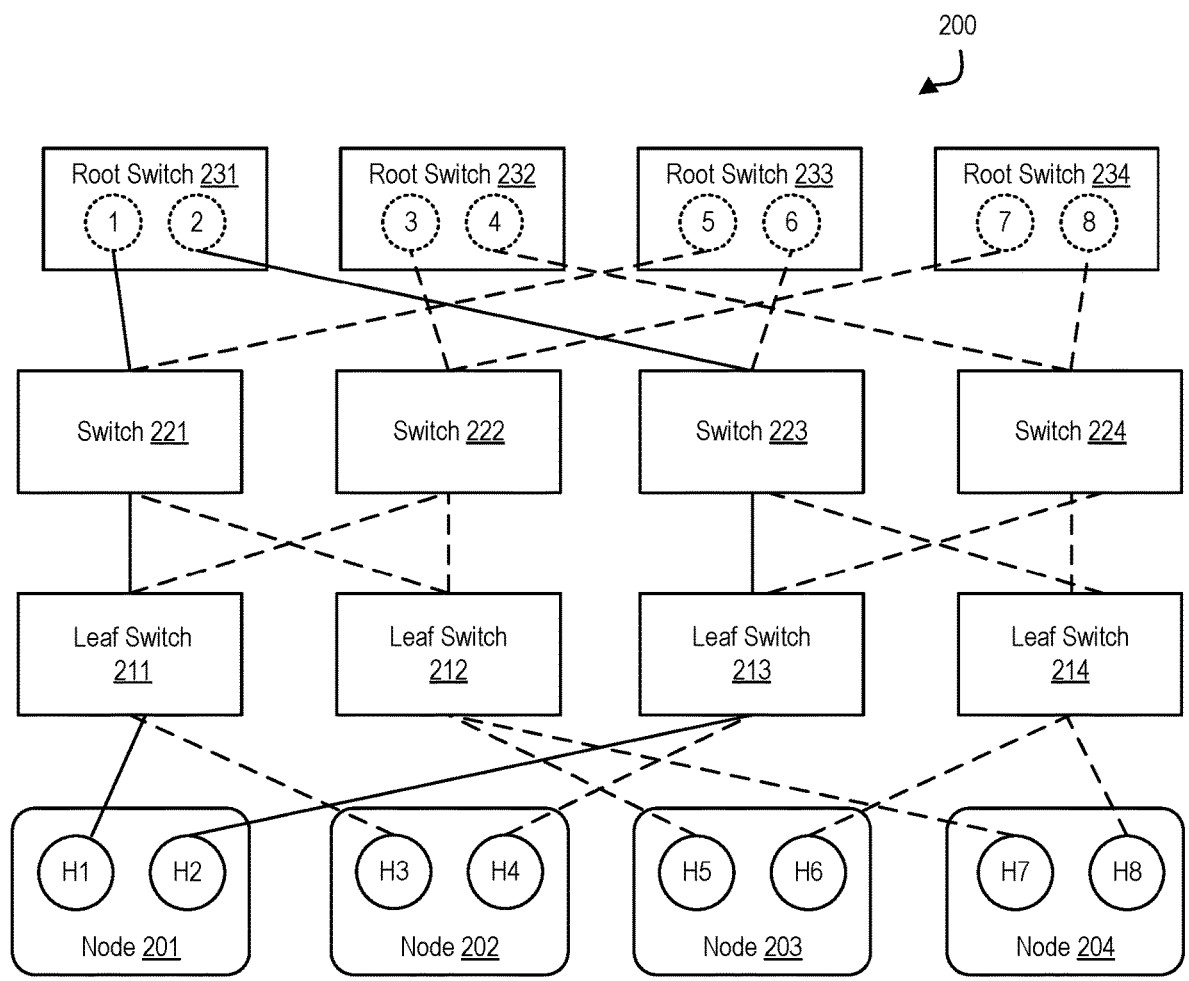
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
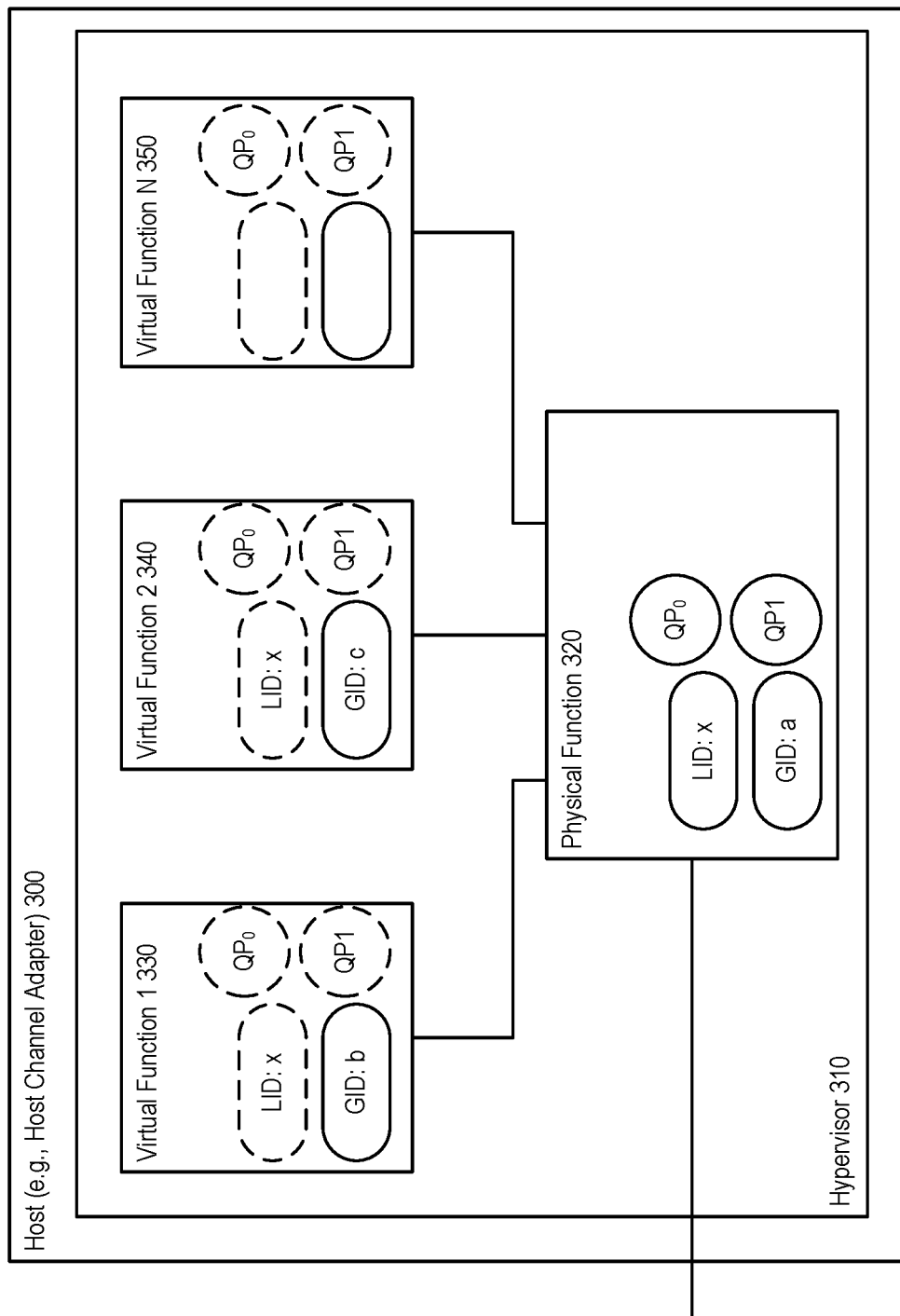
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
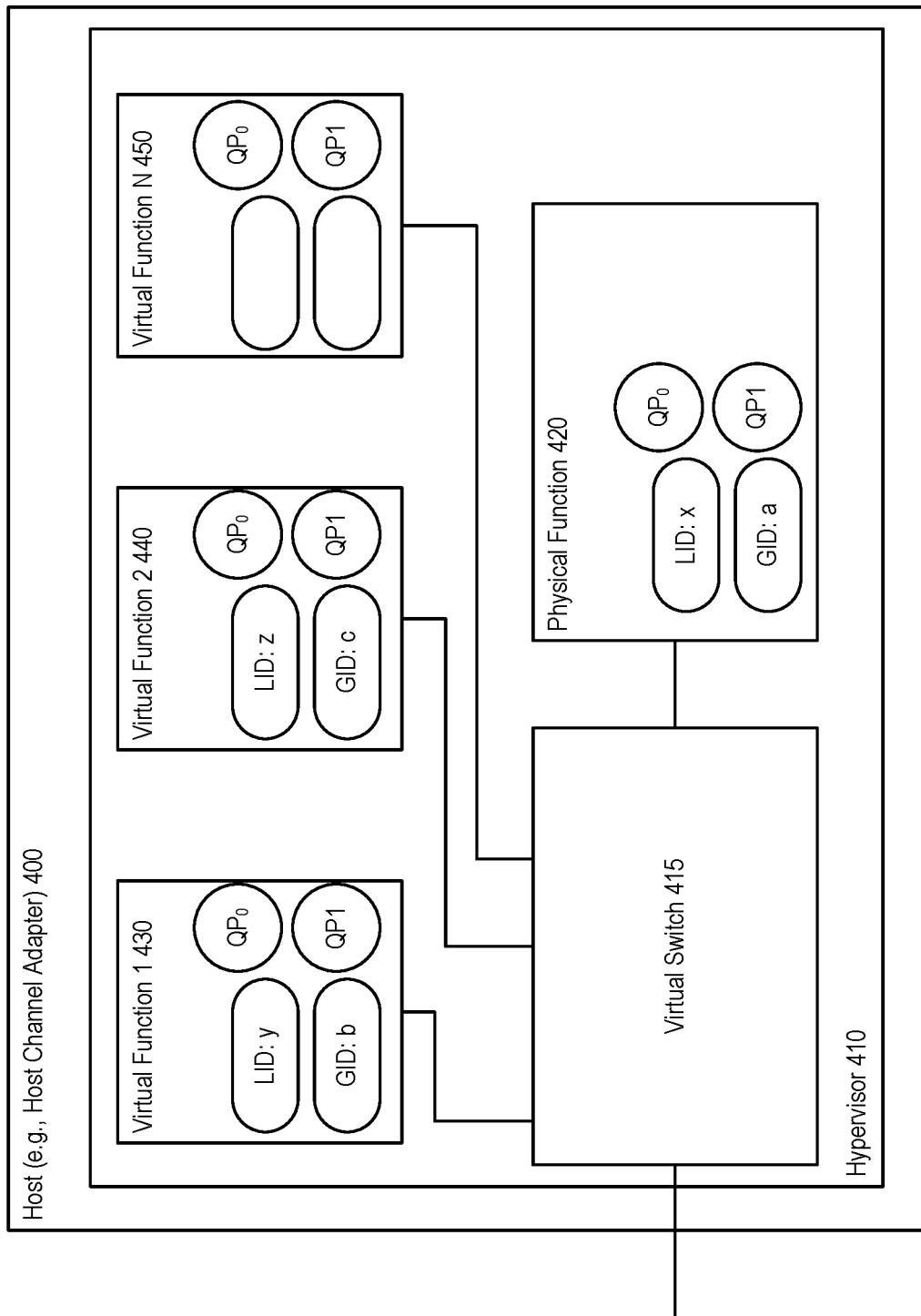
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
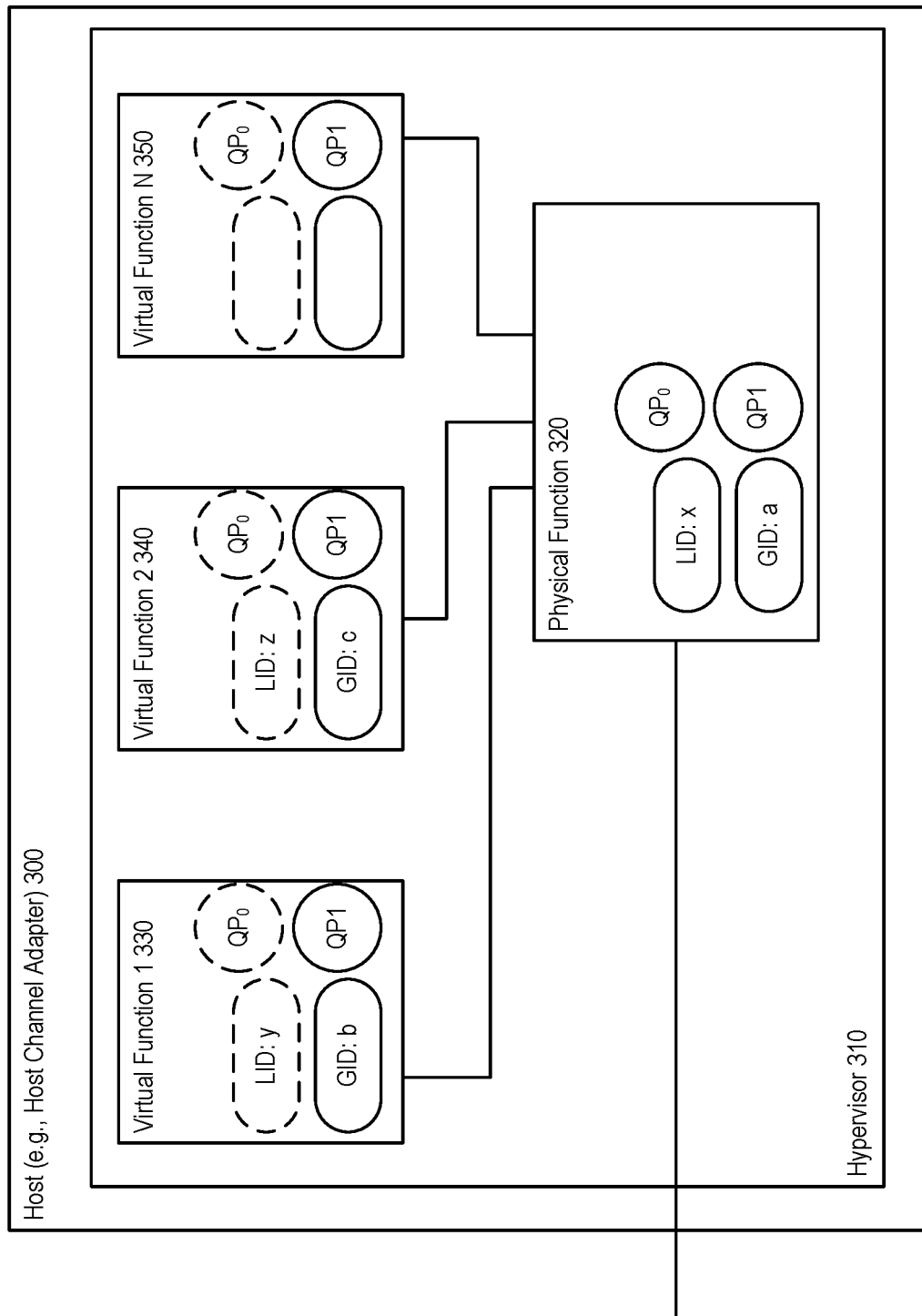
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
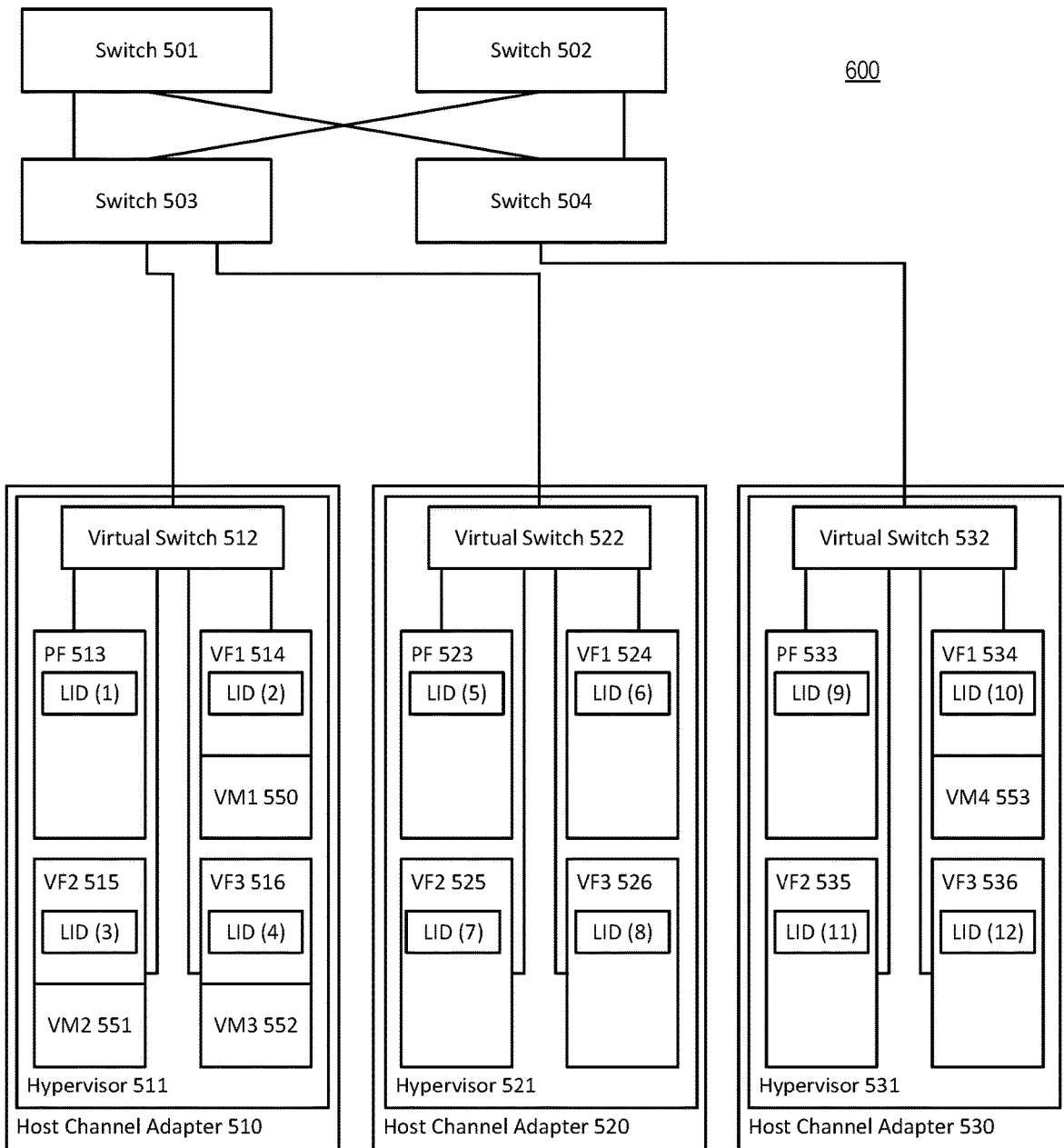
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
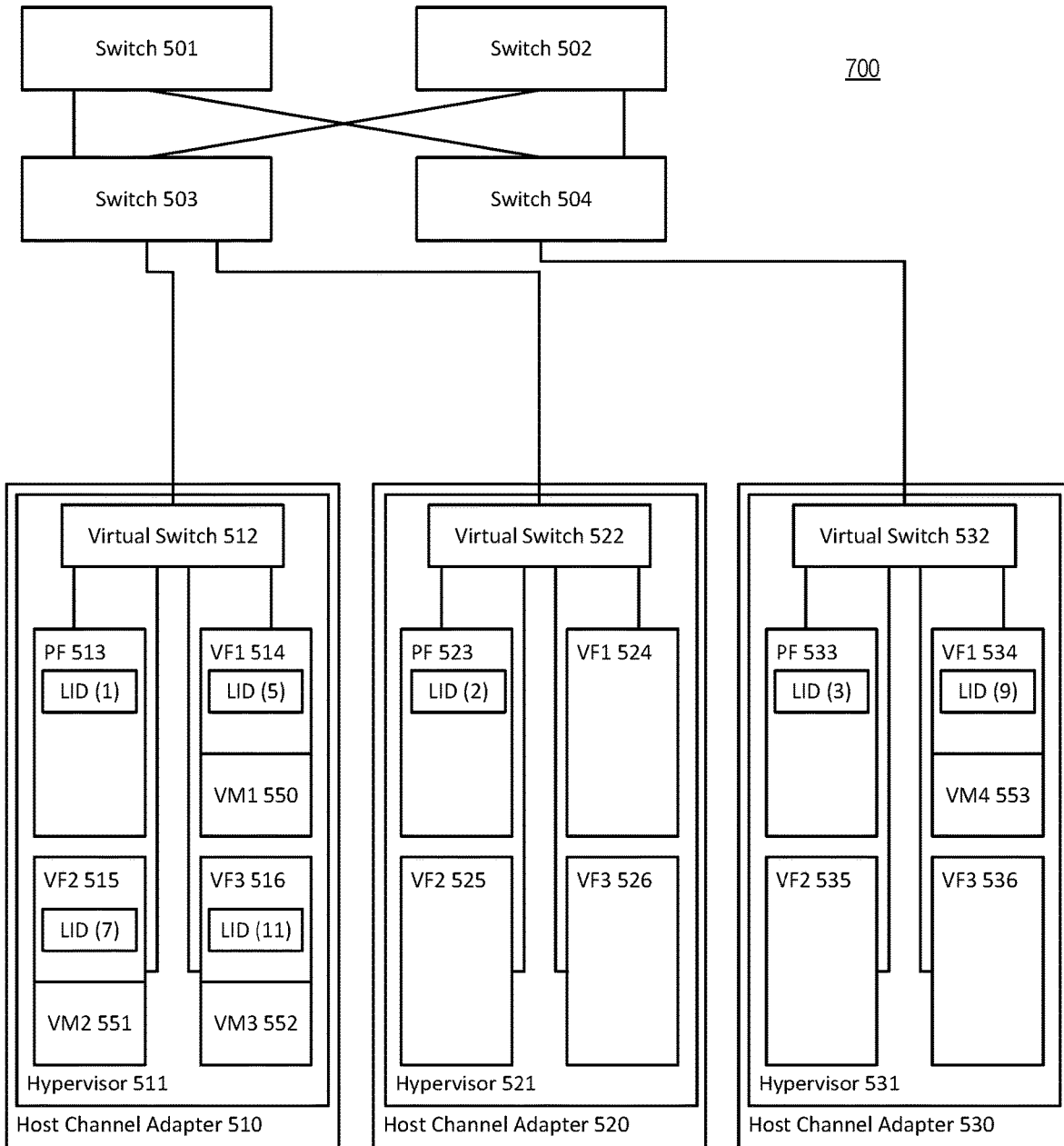
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
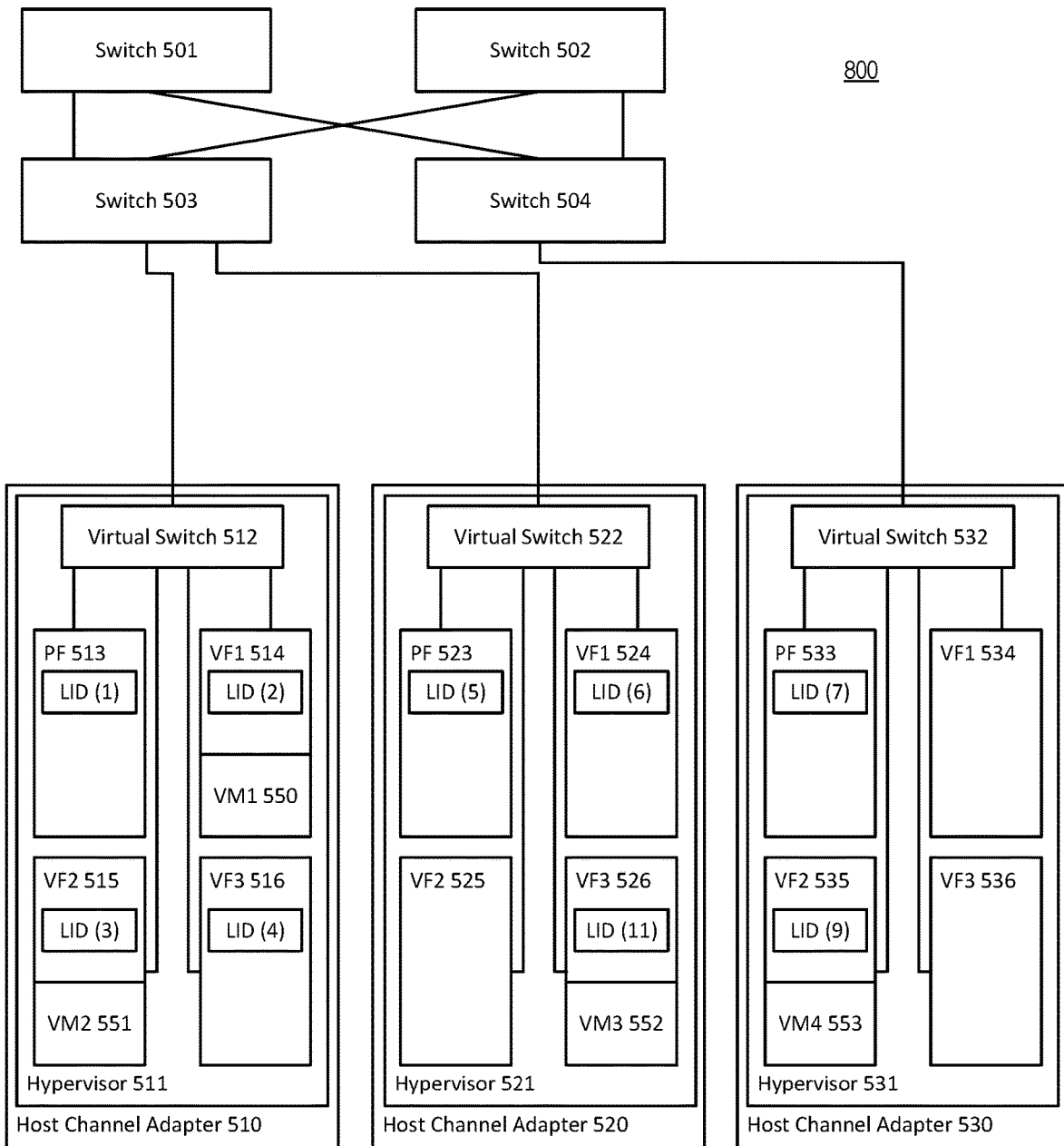
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs <=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
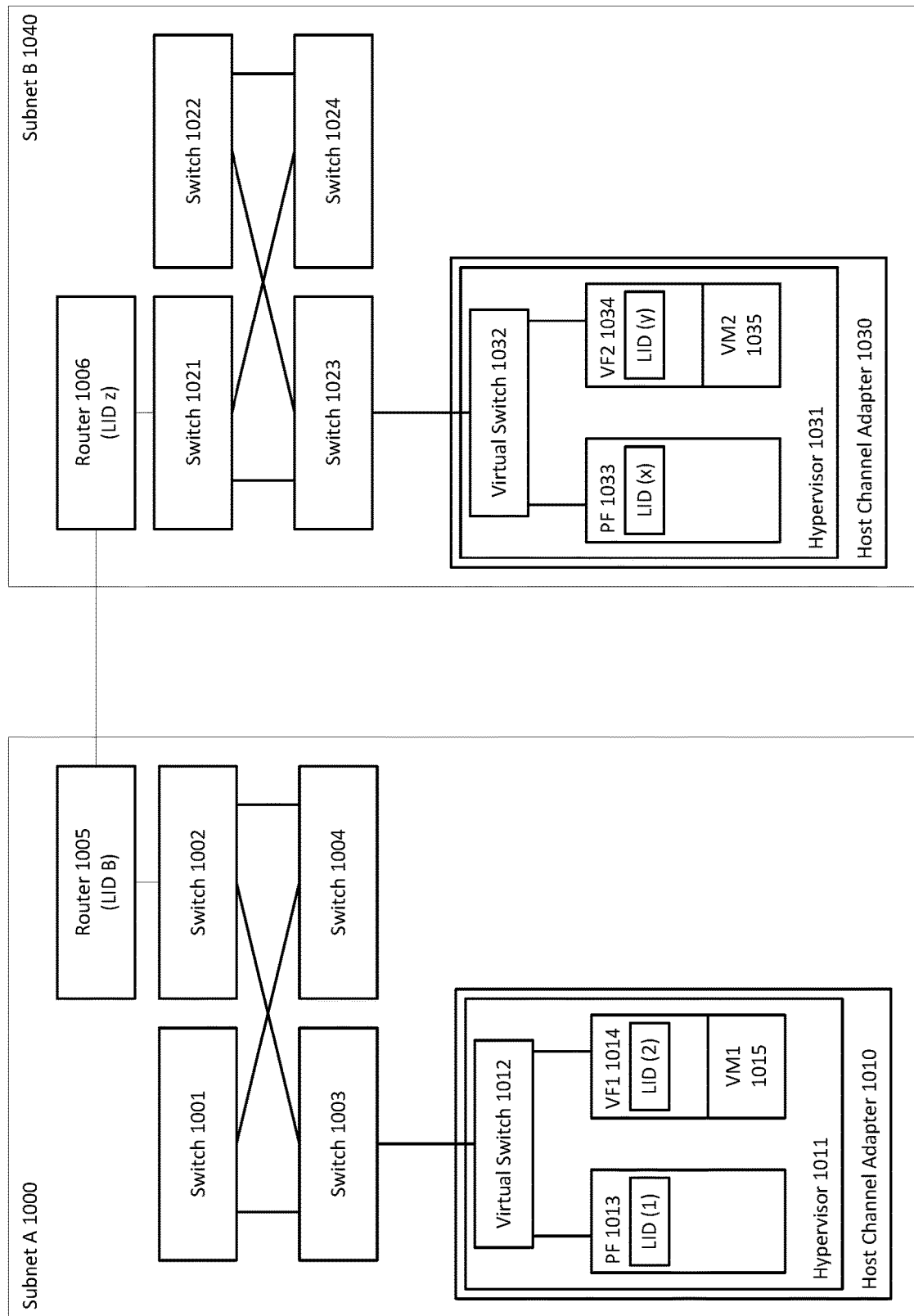
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations can follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
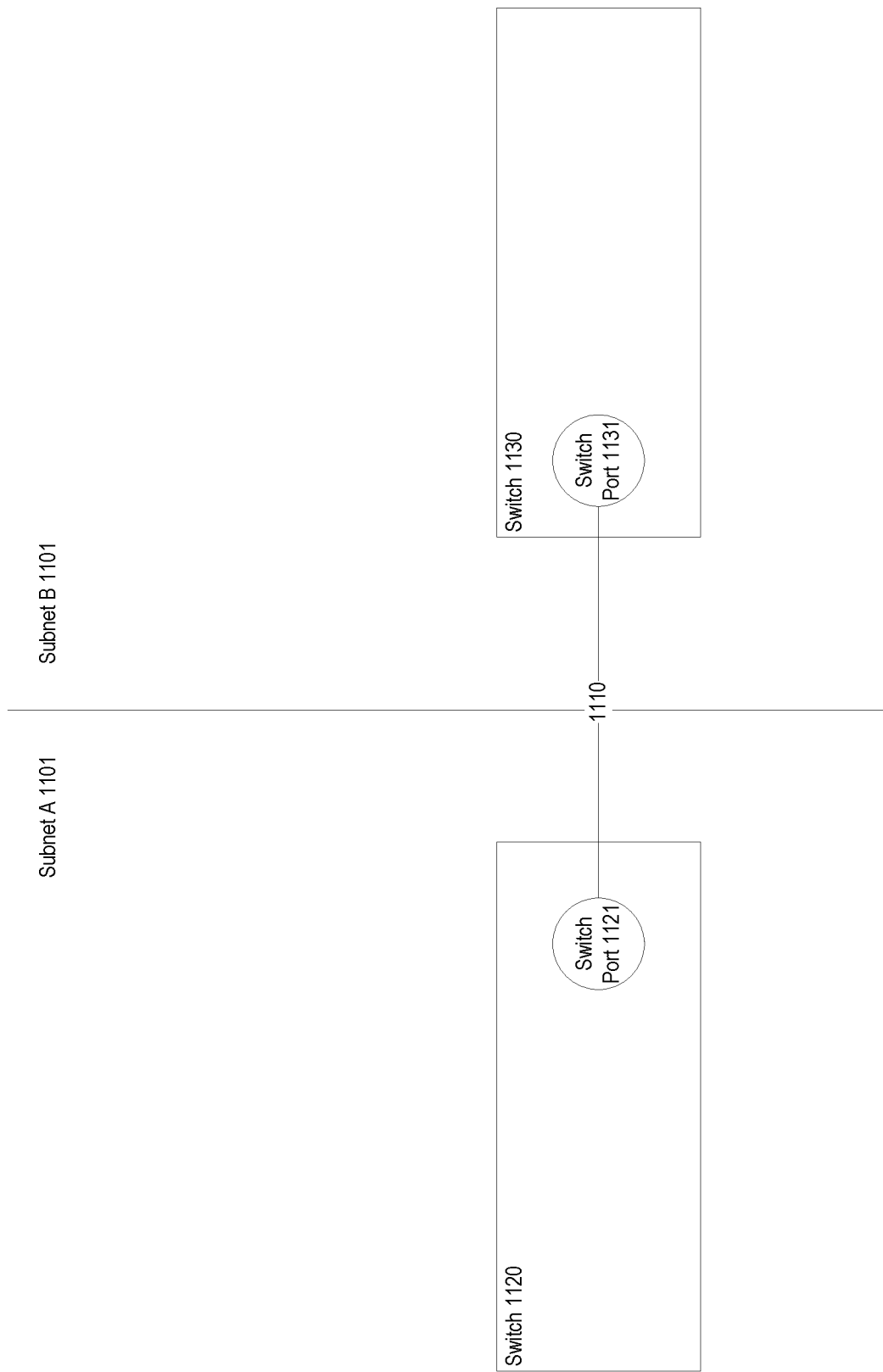
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnet A 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, a SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
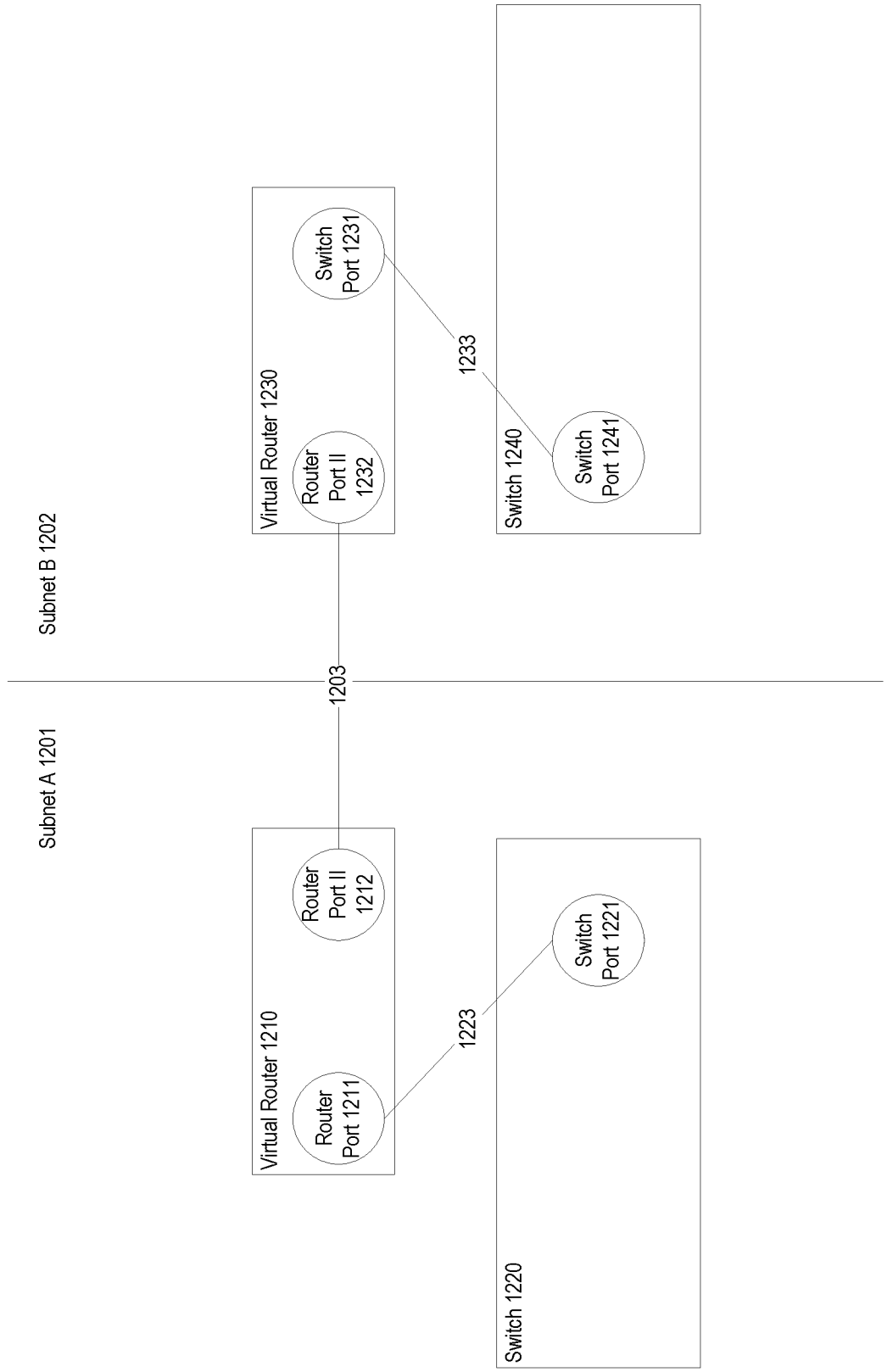
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnetA can detect router port 1211, on virtual router 1210 as an end point of the subnet that the subnet manager controls. The dual-port virtual router abstraction can allow the subnet manager on subnet A to deal with subnetA in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Redundant Fully and Semi-Independent Network

In accordance with an embodiment, a mission critical system should work correctly and provide the relevant service with correct data to the correct clients at all times within the expected response time and overall performance constraints defined for the system.

In accordance with an embodiment, for systems implemented as distributed clusters of computers, this also implies that communication between the required set of computers in the cluster must always be operational.

In accordance with an embodiment, a desirable premise for a network communication system to be operational is that all the physical connectivity between components like host adapters and switches is correct in terms of that the correct components and connectors are connected via the correct cables, and that all involved components are configured in the correct way.

In accordance with an embodiment, however, since hardware components can fail and operators can and do mistakes, it is critical that no communication depends solely on any single point of failure in the normal case. If a fault or mistake occurs that prevents communication via one component and communication path, then it is of paramount importance that this is detected and that the communication is failed over to an alternative, redundant communication path immediately—or at least before the non-operational communication path has had any significant impact on system operation or response times.

In accordance with an embodiment, also, whenever a fault is present that leaves some or all current communication vulnerable if a second failure should ever happen, it is important that relevant repair operations can take place ASAP and/or that an additional backup solution may be used to prevent total loss of service.

In accordance with an embodiment, another aspect is that since system and application software is very rarely error free, and also that there is often a need to enhance the system features over time, it is important that it is possible to upgrade the various software components in the system without causing any outages. In a distributed cluster system, this will typically imply a "rolling upgrade" model where redundant components are upgraded in a strict order so that the system is always fully operational with the required set of components and the required communication.

In accordance with an embodiment, also, in order to enhance the capabilities and/or extend the capacity of a system, physical changes in terms of additional HW components and/or replacement of an existing HW component with a more capable one may be required. Such upgrades may then also imply new software and/or firmware in the system.

However, new software and firmware versions as well as new HW versions introduce the risk of introducing new or earlier undetected errors as well as risk of interoperability problems between different software/firmware components on the same or between different nodes in the cluster. Hence, in the ideal case, the ability to operate the system should not depend on that only a single type of software is being used throughout the system, nor on the successful upgrade from one software version to another. In order to achieve this, one approach is to ensure that the required service can be implemented in redundant manner by two sets of hardware components of different types and with different sets of software and firmware, and where either no dependency at all exists between the different sets of redundant components, or only minimal and extremely well defined and controlled dependency exits.

In accordance with an embodiment, one example of such systems is the use of geographically separate systems implemented by different computer types and using different software, but where backup data can be transferred between the systems using a neutral format with minimal dependency on either system. A less strict version of this is that a primary and backup site are using the same type of equipment but are not upgraded at the same time. Hence, typically, the backup site continues to use version N until sufficient confidence has been established for version N+1 at the primary site.

In accordance with an embodiment, another approach is to have several independent implementations of the same functions operating in parallel. This approach has been used in space missions where multiple versions of critical components have been developed by different teams independently of each other. A less extreme version of this approach applied to the cluster communication infrastructure would be to have two independent networks each implemented by gear (HW and SW/FW) from different vendors, but where communication between pairs of computers can fail-over between the two network infrastructures. This approach for network redundancy can then be applied orthogonally to whether different types of computers and host software is used within the cluster in order to provide similar kinds of independence and redundancy at this level also.

In accordance with an embodiment, still, from a pragmatic perspective, cost and complexity are also important factors even when designing mission critical, highly available systems. Hence, different deployments may use different levels of redundancy and different levels of multiple infrastructure types (i.e. if more than a single) in order to fit the budget and the risk scenarios for the relevant system deployment.

In accordance with an embodiment, a fully redundant private fabric is still subject to propagation of management and congestion problems/bugs as well as "disturbance" caused by link failures and reconfiguration from one redundant part to the other when implemented as a single subnet.

In accordance with an embodiment, in order to provide two (or more) fully or semi-independent fabrics, hosts can comprise redundant connectivity to each fabric in order to prevent loss of connectivity if a pair of hosts each have lost a single connection to different independent fabrics.

In accordance with an embodiment, a challenge is to provide redundant connectivity between two fabrics that is independent of the normal management of each fabric and that is used for data communication when no other option exists.

Figure 14:
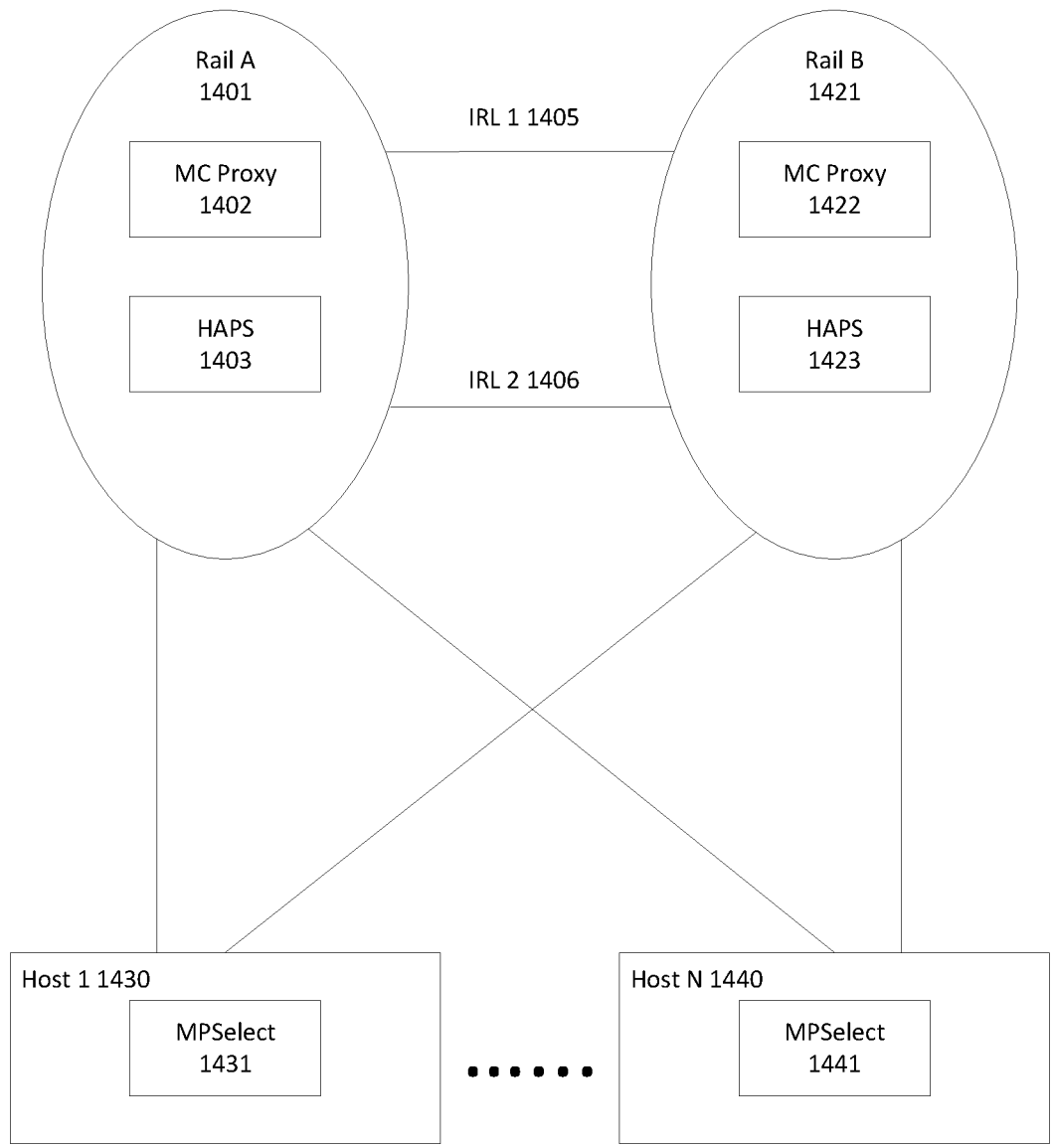
FIG. 14 shows a system for supporting redundant independent networks in a high performance computing environment, in accordance with an embodiment.

FIG. 14 shows a system for supporting redundant independent networks in a high performance computing environment, in accordance with an embodiment.

In accordance with an embodiment, two or more rails, such as Rail A 1401 and Rail B 1421 can be provided. Although not shown, each independent rail can comprise one or a plurality of interconnected switches, as well as a multicast proxy (MC Proxy), such as MC Proxy 1402 and MC Proxy 1422. In addition, each rail can comprise a highly available path service (HAPS), such as HAPS 1403 and HAPS 1423. The rails can be connected to a number of hosts, such as host 1 1430 through host N 1440. Although not shown, each host can comprise one or more end nodes connected to the rail via one or more host channel adapters. In addition, the end nodes can comprise one or more virtual machines, as described above in relation to virtualized environment (e.g., utilizing a virtual switch, virtual port, or other similar architectures as described above or similar in nature). In accordance with an embodiment, each host can comprise a multi-path selection component, such as MPSelect 1431 and MPSelect 1441.

In accordance with an embodiment, the term "rail" can be used to identify both, two, or more independent fabrics/subnets as well as the redundant connections/links from hosts. Each rail can provide a redundant, separated, point to point (for unicast), or point to multiple points (multicast) traffic between end nodes.

In accordance with an embodiment, Rail A and Rail B can be connected via one or more inter-rail links (IRL)

In accordance with an embodiment, the term "IRL" (Inter Rail Link) can be considered of as being similar to an Inter Switch Link (ISL). However, an IRL can be used in a restricted way by not being part of either rail.

In accordance with an embodiment, the term "MC Proxy" can refer to a Multicast Proxy. An MC Proxy can comprise a highly available component that forwards selected multicast packets from one rail to the other (e.g., ARP (address resolution protocol) requests).

In accordance with an embodiment, the term "HAPS" can refer to a HA (highly available) Path Service. HAPS can comprise a highly available component that operates within the context of one rail, but communicates with a peer in the other rail to enable unicast data traffic forwarding via IRL(s) whenever this is required/requested for two hosts to communicate.

In accordance with an embodiment, the term "MPSelect" can refer to a host based HA/Multi-path logic to select which rail to use for different connections to different peer hosts.

In accordance with an embodiment, in a single rack topology, two leaf switches within the rack can represent two rails (i.e., the smallest topology where two rails are separated by hardware). There can be at least two IRLs between the Leaf Switches. In the case of an InfiniBand topology, each Leaf Switch can be a single subnet with an embedded Subnet Manager that is always the master subnet manager for each respective rail.

In accordance with an embodiment, in a multi-rack topology, two Leaf switches in each rack can represent two rails. Each leaf switch in a single rack represents a different rail. At least one Spine switch in each rack. The set of spines is divided into two groups—one for each rail. There can be special handling of dual and 3-rack configuration to avoid single spine is SPOF (single point of failure) in any rail. Leaf switches in one rail are connected to all spines in the same rail (but not to the other). For M>1 IRLs between two or more pairs of spines from each rail. In the case of an InfiniBand topology, redundant SMs can be provided, located on two or more switches (or possibly dedicated hosts) within each rail In accordance with an embodiment, in both single rack and multi-rack topologies, Fat-Tree routing can ignore inter rail links. In the case of an InfiniBand topology, different rails are configured with different M_Keys (management keys) ensuring no Subnet Manager interaction/interference across IRLs.

In accordance with an embodiment, a "HA path service" (HAPS) can keep track of the complete HCA node and port population in each subnet. (This may also include System Image GUID for handling hosts with multiple HCA configurations).

In accordance with an embodiment, the HAPS can use GID-in-service/GID-out-of-service event notification from SA or special protocol. In the case where the HAPS is implemented as a host based service (that may be co-located with MC proxy instance(s)), then no special protocol is required by default for keeping track of node population, but the HAPS will then have a scope that is limited by the partitions that the relevant HCA port can be member of.

In accordance with an embodiment, a HAPS implementation that is co-located with the master SM can have a more direct interaction with the SM, and would not be limited to representing only specific partitions.

In accordance with an embodiment, the HAPS can keep track of switches with "cross-link" ports in each L2 subnet and ensure correct connectivity. This is similar to how an "Inter Subnet Manager" can ensure correct connectivity between peer router ports.

In accordance with an embodiment, the HAPS can establish unicast LID forwarding for "remote LIDs" that require unicast forwarding via cross link. This can in principle be done "independently" of the master SM in the relevant L2 subnet. The requirement would be that the SM can be instructed (configuration policy to use a specific LID range, but still set up an "LinearFDBTop" value for each switch that is based on a separate configuration parameter. In this way, the master SM in each L2 subnet would be operating on non-overlapping LID ranges, but the switches in each L2 subnet would still be able to forward unicast packets with a DLID value in the range belonging to the other (redundant) L2 Subnet.

In accordance with an embodiment, as long as the LID range boundary is aligned on an Linear Forwarding Table (LFT) block boundary, then it is possible for the HAPS to update LFT blocks to manage the unicast cross connectivity independently of (and concurrently with) the master SM in the local subnet. The actual update may be performed directly via SMP operations, or via a special agent on the switches.

In accordance with an embodiment, an alternative scheme is that the HAPS requests the local SM to consider the relevant cross link port to represent all the remote LIDs that are currently required for remote connectivity via this cross-link port. (This is similar to handling of router ports, but a router port only requires a single LID that is handled during the normal subnet discovery/initialization process, whereas this would be a completely new SM operation.)

In accordance with an embodiment, the local Master SM/SA can be provided with path records for remote PortGIDs that reflects the relevant DLID (similar to how an "Inter Subnet Manager" provides path records for remote ports to the local Master SM in a router based context.) Without router ports, the SA can then be able to look up path records based on the supplied info, but can be able to understand that the cross-link port is the "local destination" in the local subnet.

In accordance with an embodiment, if this unicast cross link handling is combined with a scheme where no Path Record Query is required (see, e.g., U.S. patent application entitled "SYSTEM AND METHOD FOR SUPPORTING NODE ROLE ATTRIBUTES IN A HIGH PERFORMANCE COMPUTING ENVIRONMENT", application Ser. No. 15/416,899, filed on Jan. 26, 2017, and U.S. Pat. No. 7,991,006 entitled "Filtering Redundant Packets in Computer Network Equipments", which are herein incorporated by reference), then the local SM/SA does not need to know about paths to remote PortGUIDs at all.

Figure 15:
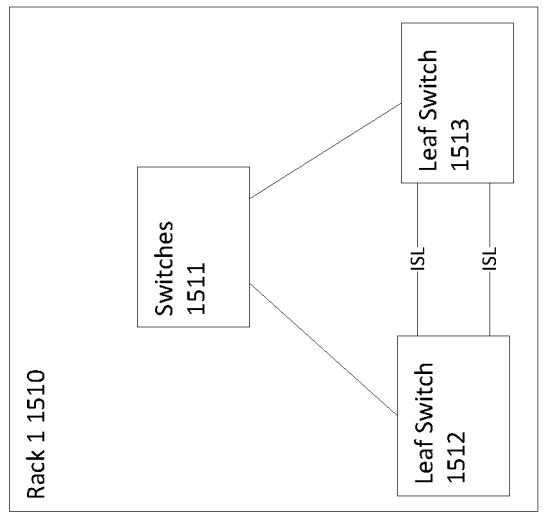
FIG. 15 shows a system for supporting redundant independent networks in a high performance computing environment, in accordance with an embodiment.

FIG. 15 shows a system for supporting redundant independent networks in a high performance computing environment, in accordance with an embodiment.

In accordance with an embodiment, the figure shows a single rack implementation for supporting redundant independent networks in a high performance computing environment.

In accordance with an embodiment, within a single rack topology, the rack can comprise two or more leaf switches 1512-13. The rack can additionally and optionally comprise a number of other switches 1511. These additional switches are optional as the smallest base configuration for a single rack topology are two leaf switches.

In accordance with an embodiment, within a single rack topology with two leaf switches that are interconnected by a set of Inter Switch Links (ISLs) or intr-rail link (IRLs)), two or more rails can be defined either through leaf switch partitioning, by assigning each leaf switch to a distinct rail.

In accordance with an embodiment, in the case of no leaf switch partitioning, depending on switch hardware specific restrictions on packet buffer allocation and switch HW resource organization in general, there may be restrictions on which port numbers can be used for the ISLs.

In accordance with an embodiment, in such a situation, each leaf switch 1512 and 1513 represents a separate rail with the ISLs representing IRLs. In the specific case of an InfiniBand fabric, each leaf switch represents a single subnet with an embedded subnet manager that is a master subnet manager.

In accordance with an embodiment, in a situation where ports on each leaf switch are partitioned in such a way to provide two rails within each leaf switch, then the total number of ports at each leaf switch are divided into two partitions, with each partition representing an independent or semi-independent rail. Within a RoCE fabric partition, there may again be restrictions on which port numbers can be used for ISLs. (By default the same set of ports will be used for ISLs in both the partitioned and not partitioned leaf switch case.)

In accordance with an embodiment, in order to reduce the number of switches required for implementing both the RoCE fabric as well as access to the client network from the private fabric based system in smaller (e.g. quarter rack) configurations, the leaf switches can be partitioned (e.g., the ports on the leaf switches) and used to implement the private RoCE fabric into one physical partition (i.e. set of physical ports/connectors) that represents the private RoCE fabric, and another, non-overlapping partition that represents access to the client network (e.g. the on-premise data-center network). Hence, each such physically partitioned switch can have two non-overlapping sets of ports where only the set of ports that is dedicated to the private RoCE fabric will be allowed to represent connectivity within the RoCE fabric (and vice versa).

Figure 16:
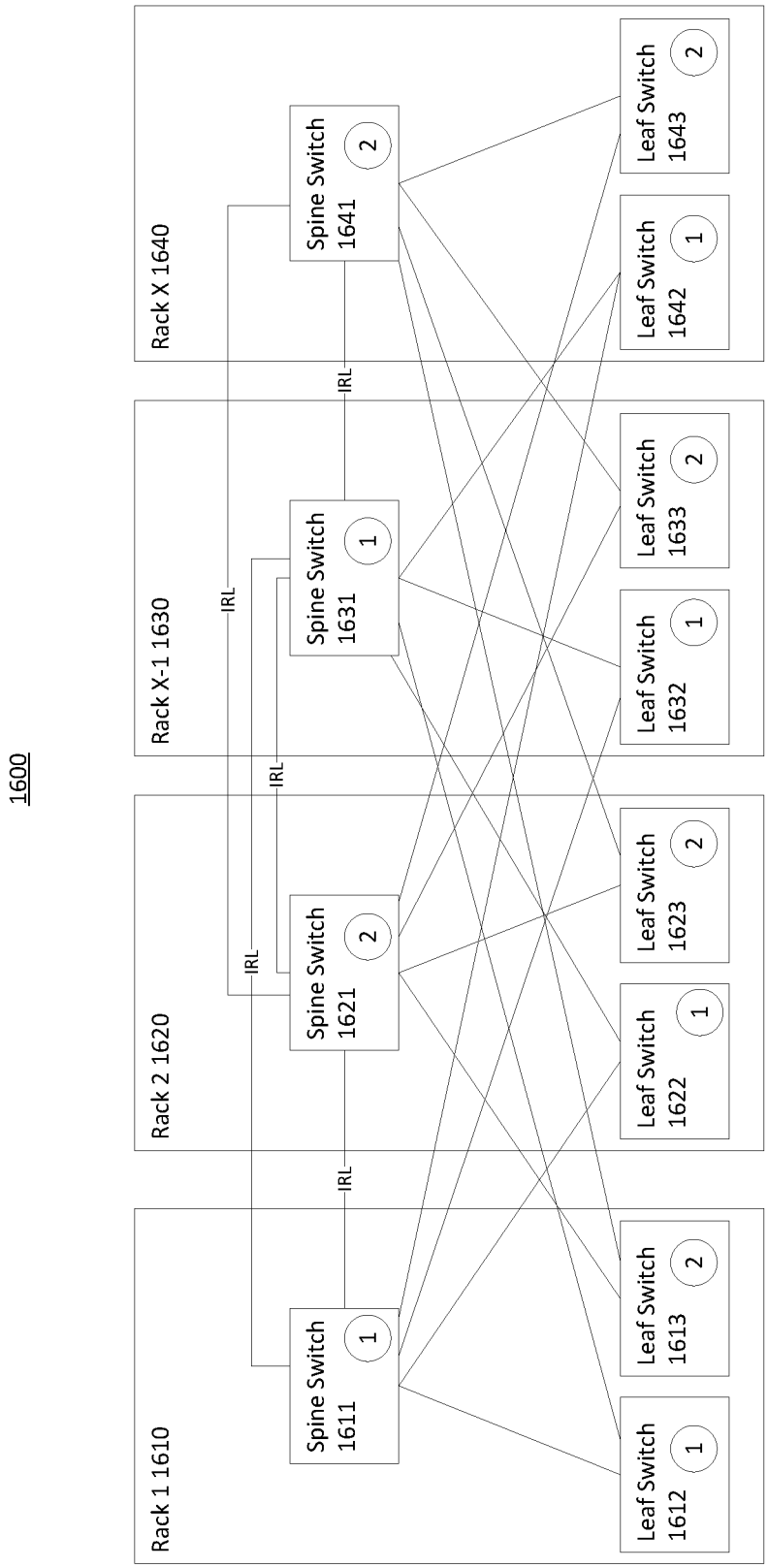
FIG. 16 shows a system for supporting redundant independent networks in a high performance computing environment, in accordance with an embodiment.

FIG. 16 shows a system for supporting redundant independent networks in a high performance computing environment, in accordance with an embodiment.

In accordance with an embodiment, in a multi-rack topology, there can be X number of racks, where each rack comprises a number of switches, including at least a leaf switch. In the depicted embodiment, the system 1600 comprises X racks, including rack 1 1610, rack 2 1620, rack X-1 1630, and rack X 1640. Each rack comprises a number of switches: rack 1 comprises leaf switches 1612-13 and spine switch 1611, rack 2 comprises leaf switches 1622-23 and spine switch 1621, rack X-1 comprises leaf switches 1632-33 and spine switch 1631, and rack X comprises leaf switches 1642-43 and spine switch 1641. Each spine switch also is connected to two inter-rail links, as shown in the figure.

In accordance with an embodiment, in a multi-rack topology, each rack comprises at least two leaf switches, and where the leaf switches belong to separate rails. In the figure, the rail that each switch belongs to is indicated by either a "1" or a "2" shown in each switch. As well, in a multi-rack topology, there is at least one spine switch in each rack. The set of spine switches is divided into two groups, one for each rail. Leaf switches in one rail are connected to all spine switches of the same rail, but not to spine switches of a different rail. There can be M greater than 1 IRLs between two or more pairs of spine switches from each rail. In InfiniBand topologies, redundant subnet managers on two or more switches (or dedicated hosts) within each rail.

In accordance with an embodiment, each leaf switch in each rack has a set of Up-Links that are distributed among all the Spine switches in the fabric. Depending on switch HW specific restrictions on packet buffer allocation and switch HW resource organization in general, there may be restrictions on which port numbers can be used for Up-Links. Each spine switch has a number of Down-Links that are distributed between all the Leaf switches in the fabric.

In accordance with an embodiment, as long as the spine switches are only supposed to provide Down-Link connectivity, there does not have to be any difference in characteristics among different ports. However, since not all Spine ports may be utilized (connected) in a specific configuration, there may still be a reason for restricting which port numbers can be used for Down-Links.

In accordance with an embodiment, in the case of multi-rack configurations, there is typically no use of partitioned leaf switches. Whereas, as indicated above, a single rack configuration may or may not use partitioned Leaf switches. Hence, the fabric definition in the case of single rack configuration can also include information about whether a leaf switch configuration used is partitioned or not. However, smaller multi-rack configurations that are created based on expanding an existing single rack configuration may also use partitioned leaf switches within one or more racks.

In accordance with an embodiment, both single rack topologies and multi-rack topologies can support two different embodiments, namely fully independent rails and semi-independent rails In accordance with an embodiment, for a fully independent rail topology, each rail consists of an independent set of switches, and there is no connectivity between switch ports that belongs to different rails. Typical use case for this is with two or more dual-port adapters per server.

In accordance with an embodiment, in such a case, each server (e.g., host) can have redundant connectivity to each rail. Hence, no single point of failure in terms of a single adapter or a single adapter port for any server may lead to that the corresponding server is NOT able to send and receive data traffic on any individual fabric rail.

In accordance with an embodiment, if two servers do not both have connectivity to at least one common rail, then the pair of servers (or any pair of VMs—one on each of the pair of servers) cannot belong to the same logical cluster where fabric based communication between the cluster nodes are required.

In accordance with an embodiment, in the case where non-overlapping sub-sets of adapters in each server are connected to non-overlapping sets of rails (i.e. there is no adapter that has ports connecting to more than one of the non-overlapping sets of rails), then the different rails are also independent in terms of communication protocols as well as software and firmware versions including both switch firmware, fabric management software, adapter firmware and adapter driver software.

In accordance with an embodiment, the systems and methods described herein can additionally support semi-independent rails.

In accordance with an embodiment, in a semi-independent rail topology, each rail consists of an independent set of switches, and there is no connectivity between switch ports that belong to different rails that are used for data traffic in the normal case. However, "dormant" physical connectivity may exist between switches in different rails in order to be used to provide connectivity between pairs of servers that would otherwise not be able to communicate because they do not both have operational connectivity to the same rail. Such connectivity could be implemented by IRLs or by other means.

In accordance with an embodiment, typical use-case for this configuration is when each server typically has only a single dual port adapter where each adapter port is connected to a leaf switch in a different rail. In this case, any single port/link failure for any server will imply that it cannot send or receive data traffic on the corresponding fabric rail.

In accordance with an embodiment, if two servers do not both have connectivity to at least one common rail, then either some of the "dormant" connectivity between switches in different rails can be utilized to re-establish connectivity between this particular pair of servers, or alternatively, the pair of servers (or any pair of VMs—one on each of the pair of servers) can NOT belong to the same logical cluster where fabric based communication between the cluster nodes are required.

Figure 17:
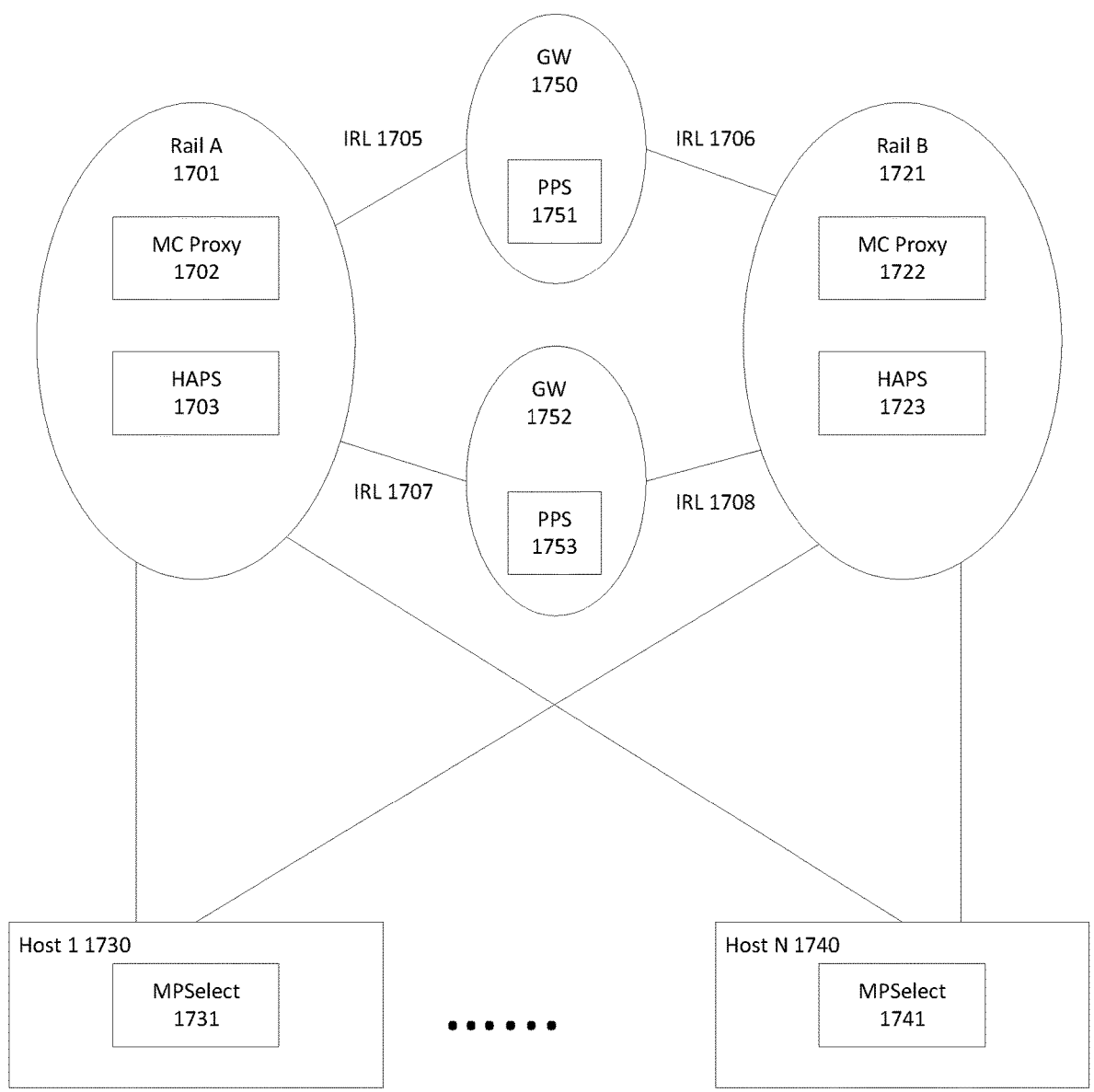
FIG. 17 shows a system for supporting redundant independent networks in a high performance computing environment, in accordance with an embodiment.

FIG. 17 shows a system for supporting redundant independent networks in a high performance computing environment, in accordance with an embodiment.

More specifically, the figure shows a dual-rail topology with IRL gateways.

In accordance with an embodiment, two or more rails, such as Rail A 1701 and Rail B 1721 can be provided. Although not shown, each independent rail can comprise one or a plurality of interconnected switches, as well as a multicast proxy (MC Proxy), such as MC Proxy 1702 and MC Proxy 1722. In addition, each rail can comprise a highly available path service (HAPS), such as HAPS 1703 and HAPS 1723. The rails can be connected to a number of hosts, such as host 1 1730 through host N 1740. Although not shown, each host can comprise one or more end nodes connected to the rail via one or more host channel adapters. In addition, the end nodes can comprise one or more virtual machines, as described above in relation to virtualized environment (e.g., utilizing a virtual switch, virtual port, or other similar architectures as described above or similar in nature). In accordance with an embodiment, each host can comprise a multi-path selection component, such as MPSelect 1731 and MPSelect 1741.

In accordance with an embodiment, instead of direct switch to switch connectivity for the inter rail links 1705-1708, there can be provided a number of gateway instances 1750 and 1752, where each gateway instance provides a packet processing engine, 1751 and 1753.

In accordance with an embodiment, a packet processing engine (PPS) can be provided at nodes in the topology, such as gateway nodes.

In accordance with an embodiment, in order to increase the level of independence between redundant fabrics, dual-port high-performance packet processing engines (PPS) can be used instead of direct switch-switch links for both control and data traffic.

In accordance with an embodiment, these kinds of packet processing engines can be used for additional multiple purposes in a scalable way. These PPS can be used to provide a firewall between different system instances. The PPS can be used to provide a gateway to cloud/data-center network to connect different private fabrics. The PPS can be used to provide a gateway between IB and Enet (Ethernet) based private fabrics. The PPS can be used to provide a gateway between private fabric and client network.

In accordance with an embodiment, systems and methods can keep track of physical and logical connectivity. This can be achieved by leveraging leaf switch monitoring of connected end-ports as well as inter-switch connectivity. Additionally, systems and methods can make use of hierarchical query and reporting schemes in order to distribute all relevant connectivity and aliveness information about all relevant end nodes and ports to all relevant peer nodes. Such reporting can also include nodes and ports that have full connectivity to local leaf switches but where connectivity in the intermediate fabric is limited.

Additionally, systems and methods can leverage adapter/NIC firmware/driver alive-check schemes to detect and report node death (in addition to link failures) to reduce/avoid need for additional peer-peer checks, in addition to facilitating path re-balancing and fail-over.

In accordance with an embodiment, systems and methods can support multicast, address resolution and path selection. Idempotent multicast operations like ARP can be done in parallel on multiple rails. In order to ensure "at least once" semantics for multicast, either selective replication is allowed, or multicast traffic can use an extended protocol that allows receivers to process a single MC message only once. Multiple concurrent address resolution requests to the same node can be responded to by multiple interfaces on different rails and then the requester may select the rail to use for further communication.

Figure 18:
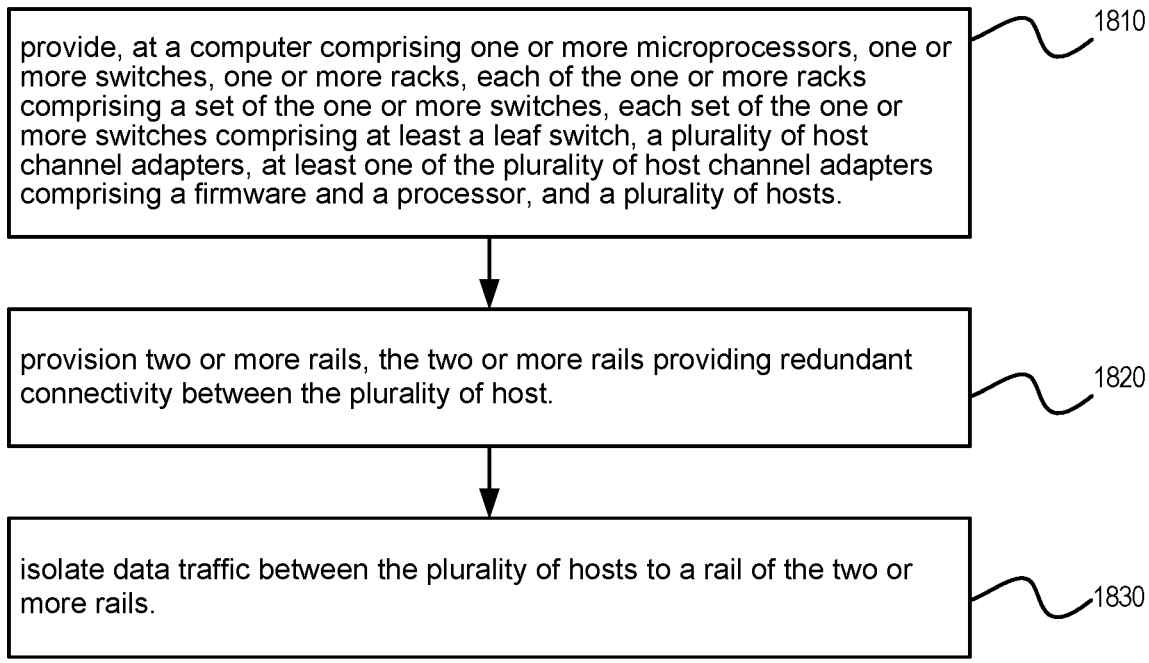
FIG. 18 is a flowchart of a method for a redundant independent network in a high performance computing environment.

FIG. 18 is a flowchart of a method for a redundant independent network in a high performance computing environment, in accordance with an embodiment.

At step 1810, the method can provide, at a computer comprising one or more microprocessors, one or more switches, one or more racks, each of the one or more racks comprising a set of the one or more switches, each set of the one or more switches comprising at least a leaf switch, a plurality of host channel adapters, at least one of the plurality of host channel adapters comprising a firmware and a processor, and a plurality of hosts.

At step 1820, the method can provision two or more rails, the two or more rails providing redundant connectivity between the plurality of hosts.

At step 1830, the method can isolate data traffic between the plurality of hosts to a rail of the two or more rails.

In accordance with an embodiment, when implementing a highly available cluster network/fabric it is important that redundancy is implemented in a way that minimizes the risk of problems in one area of the fabric are propagating to other redundant areas of the fabric.

In accordance with an embodiment, also, when a recovery or fail-over action is required within the fabric, it is important that such actions do not impose a load on either control-plane or data-plane infrastructure that can cause significant performance or forward progress issues.

In accordance with an embodiment, in order to allow the system size to scale and also be compatible with legacy highly available host communication run-time systems, each host can have redundant interface connectivity to the fabric, and each such redundant interface can reach any other interface in the redundant fabric. In particular, this implies that if two hosts each are having problems with one interface, then they should still be able to communicate using the remaining operational interface. Hence, interface redundancy can apply to each individual host, and does not have any dependency on which interfaces are available on other hosts.

In accordance with an embodiment, whenever a host interface or a switch fails, it can be possible to re-establish relevant communication without any dependency on which interface is used to initiate such communication. This implies that the network level redundancy cannot be based on two fully independent networks where no packet injected in one of the networks can be forwarded to the other network. Hence, in order to support legacy HA communication schemes while maximizing the independence between redundant networking components, a "semi-independent rail" model can be used.

Goals for the "Semi-Independent" HA Fabric:

In accordance with an embodiment, each redundant host interface should connect to an independent L2 subnet (aka "rail") in the HA fabric.

In accordance with an embodiment, there can exist a single broadcast domain across the two L2 subnets that allows ARP requests from a single interface to reach all other operational host interfaces independently of which L2 subnet each such interface is directly connected to.

In accordance with an embodiment, data traffic (e.g. RDMA) between hosts should not cross between L2 subnets as long as at least one of the L2 subnets has at least one connected and operational interface for each of the hosts.

In accordance with an embodiment, whenever any pair of hosts that need to communicate are not both able to establish data traffic between interfaces on a single L2 subnet, then a path between the L2 subnets should be established for the needed data traffic between the relevant hosts.

In accordance with an embodiment, the host stacks on each host can be able to easily determine which interface to use for communication with a specific other host,—even if the default decision on each hosts involves a different "rail".

In accordance with an embodiment, in the case of Infini-Band, it should not be possible for hosts to initiate SA requests that cross L2 subnet boundaries.

In accordance with an embodiment, it should not be possible for hosts to cause congestion spreading from one L2 subnet to the other.

Specific Implementation Aspects for InfiniBand Fabric:

HA Path Service (HAPS):

In accordance with an embodiment, a "HA path service" (HAPS) can keep track of the complete HCA node and port population in each subnet. (This may also include System Image GUID for handling hosts with multiple HCA configurations).

In accordance with an embodiment, the HAPS can use GID-in-service/GID-out-of-service event notification from SA or special protocol. In the case where the HAPS is implemented as a host based service (that may be co-located with MC proxy instance(s)), then no special protocol is required by default for keeping track of node population, but the HAPS will then have a scope that is limited by the partitions that the relevant HCA port can be member of.

In accordance with an embodiment, a HAPS implementation that is co-located with the master SM can have a more direct interaction with the SM, and would not be limited to representing only specific partitions.

In accordance with an embodiment, the HAPS can keep track of switches with "cross-link" ports in each L2 subnet and ensure correct connectivity. This is similar to how an "Inter Subnet Manager" can ensure correct connectivity between peer router ports.

In accordance with an embodiment, the HAPS can establish unicast LID forwarding for "remote LIDs" that require unicast forwarding via cross link. This can in principle be done "independently" of the master SM in the relevant L2 subnet. The requirement would be that the SM can be instructed (configuration policy to use a specific LID range, but still set up an "LinearFDBTop" value for each switch that is based on a separate configuration parameter. In this way, the master SM in each L2 subnet would be operating on non-overlapping LID ranges, but the switches in each L2 subnet would still be able to forward unicast packets with a DLID value in the range belonging to the other (redundant) L2 Subnet.

In accordance with an embodiment, as long as the LID range boundary is aligned on an Linear Forwarding Table (LFT) block boundary, then it is possible for the HAPS to update LFT blocks to manage the unicast cross connectivity independently of (and concurrently with) the master SM in the local subnet. The actual update may be performed directly via SMP operations, or via a special agent on the switches.

In accordance with an embodiment, an alternative scheme is that the HAPS requests the local SM to consider the relevant cross link port to represent all the remote LIDs that are currently required for remote connectivity via this cross-link port. (This is similar to handling of router ports, but a router port only requires a single LID that is handled during the normal subnet discovery/initialization process, whereas this would be a completely new SM operation.)

In accordance with an embodiment, the local Master SM/SA can be provided with path records for remote PortGIDs that reflects the relevant DLID (similar to how an "Inter Subnet Manager" provides path records for remote ports to the local Master SM in a router based context.) Without router ports, the SA can then be able to look up path records based on the supplied info, but can be able to understand that the cross-link port is the "local destination" in the local subnet.

In accordance with an embodiment, if this unicast cross link handling is combined with a scheme where no Path Record Query is required, then the local SM/SA does not need to know about paths to remote PortGUIDs at all.

Identification and Handling of "Cross-Link" Ports:

In accordance with an embodiment, by default, the redundant InfiniBand L2 subnets can be set up with non-overlapping M_Key ranges prior to that any cross link connectivity would be provided and/or prior to any SMs being active in either L2 subnet. In this way, the SMs in each redundant subnet would not try to discover or configure anything beyond the switch port in the local subnet connecting to the neighbor redundant subnet.

In accordance with an embodiment, it is not expected that an existing operational single subnet based system can be converted into a dual L2 subnet configuration without significant interruption of normal operation. Hence, the expectation is that this kind of reconfiguration will take place in a maintenance window where the system services are not expected to be operational.

In accordance with an embodiment, using Vendor Specific SMA attributes, it will also be possible to establish a protocol that enables explicit configuration of a switch as belonging to a specific redundant L2 subnet, as well as which switch port numbers are supposed to represent cross-link connectivity to the peer redundant L2 subnet.

In accordance with an embodiment, use of Vendor Specific SMA attributes would be similar to how an "Inter Subnet Manager" handles virtual router ports. However, since no router port or port virtualization exists in this context, the implementation will be quite different.

In accordance with an embodiment, based on detailed configuration info and possibly reliance on node-description sub strings, it would be possible to identify and handle cross-link ports also without use of the special Vendor Specific SMA attributes, but this would be more complex and also more exposed to configuration errors.

Specific Implementation Aspects for Ethernet (Private) Fabric:

In accordance with an embodiment, redundancy within interconnect fabrics should as much as possible ensure that failures/problems in one redundant part do not propagate to other parts. Ultimately this implies physically and logically independent infrastructures. However, the cost of this is that either each node can have redundant connectivity to each such independent fabric, or else the ability to recover connectivity between two or more servers each with a single link problem is significantly reduced. By utilizing new ways to provide Ethernet link connectivity between two independent subnets without impacting the management or fault containment for each individual subnet, it is possible to address both goals at the same time.

In accordance with an embodiment, the Ethernet private fabric can be implemented using a conventional Ethernet unicast forwarding scheme with combination of spanning tree and link aggregation variants, or it can be implemented using explicit forwarding of individual unicast destination addresses in the same way as forwarding of IB packets within a single IB subnet is implemented.

In accordance with an embodiment, in the case of explicit forwarding of individual unicast addresses, the high-level scheme is the following:

In accordance with an embodiment, the complete topology in terms of port-port connectivity between switch-ports and between switch ports and end-ports is collected from the relevant set of switches. (Optimizations may include only collecting topology deltas following an initial full discovery.)

In accordance with an embodiment, the topology information is transformed into a format that can be handled by the same routing logic (aka routing engine) that is used for a corresponding InfiniBand fabric.

In accordance with an embodiment, the routing engine uses the topology along with (e.g. VLAN) policy for which physical end ports are allowed to communicate (as well as other relevant optimization and balancing criteria similar to the IB fabric case) and produces a list of end-port address to port mapping tuples for each switch instance in the topology.

In accordance with an embodiment, the resulting (delta) forwarding entry lists are distributed to the switches (i.e. the ones that need updates).

In accordance with an embodiment, multicast can in any case be implemented using legacy Ethernet schemes for both end-port membership handling and forwarding of MC packets.

Multicast Proxy Service:

In accordance with an embodiment, the same/similar considerations as for the InfiniBand case applies. If the L2 source address in the proxied MC packet is not the same as the corresponding ARP request "sender hardware address", then the ARP request may be discarded, or the generation of unicast ARP response may result in an incorrect L2 destination address. As in the InfiniBand case, in order to avoid dependency on special host stack handling, the best approach is that the proxy is able to send out the proxied MC packet with a source L2 address that corresponds to the original sender in the other L2 subnet.

HA Path Service (HAPS):

In accordance with an embodiment, the "HA path service"—HAPS can keep track of the complete end port population in each subnet.

In accordance with an embodiment, the ports that belong to the same NIC or same host can be correlated between the two subnets.

In accordance with an embodiment, as in the IB case, the situation where pairs of hosts are only able to communicate if the relevant unicast traffic is forwarded via cross-links between the two subnets can be identified.

In accordance with an embodiment, in the case where explicit end-port address forwarding is used for unicast traffic then the handling will be very similar to the IB case. However, in the case of legacy Ethernet unicast forwarding, and in the general case, this may require a proxy type gateway function also for unicast traffic.

In accordance with an embodiment, since the unicast forwarding within an Ethernet fabric is based on MACs, then there is no restriction on MAC ranges used for the various L2 subnets.—The only restriction is that each host port should have a MAC that is at least unique within the relevant site/domain. In the case of a private fabric, the relevant domain is then the two redundant L2 subnets.

In accordance with an embodiment, in the case where switches can perform forwarding based on either L2 and/or L3 addresses, it would also be possible to use forwarding based on L3 (IP) addresses instead of L2 MACs.

Identification and Handling of "Cross-Link" Ports:

In accordance with an embodiment, based on that individual switches are configured to belong to different "rails" combined with the neighbor connectivity info from each switch, it is possible to identify both switch-switch connectivity that belongs to the same rail/subnet (fat tree) topology as well as intended (or accidental . . . ) cross-link connectivity.

In accordance with an embodiment, the cross-link connectivity will then never be considered for the normal forwarding of either unicast or multicast connectivity, but the intended cross-connectivity will be used for backup inter-rail paths in the case of explicit end-port address forwarding. As pointed out above, the use of cross-links when legacy Ethernet unicast forwarding schemes are being used would in general require proxy/gateway functions for both multicast and unicast forwarding between different rails.

In accordance with an embodiment, when configuring Ethernet switches and NICs for RoCE based RDMA traffic, the relevant links are usually configured in "loss-less" mode where the down-stream switch or NIC port will generate "pause frames" to the up-stream sending switch or NIC port whenever the available packet receive buffer capacity is below a certain threshold. The sending port will then stop (pause) sending more packets on the relevant priority (if any) until the down-stream port again has buffer capacity above a certain threshold.

In accordance with an embodiment, as with other networking technology where packet flow control can lead to back pressure throughout the network, a lossless RoCE fabric topology must be routed in a deadlock free manner. Also, flows that are supposed to have forward progress independently of each other must use different priorities.

In accordance with an embodiment, in the case of dual-rail topologies, it makes sense to ensure that only the internal topology of a single rail must be considered in terms of deadlock freedom. By configuring cross links as "lossy" (i.e. down-stream switch ports will not send pause frames), it is possible to provide deadlock free routing of the topology in each rail without considering the topology in the rail(s) connected by the cross links. Instead, cross link ports will be considered end-ports within the local rail from a deadlock free routing perspective, and hence they cannot be part of any cycle dependency that could lead to deadlock.

In accordance with an embodiment, the lossless cross link configuration will also imply that no congestion in one rail will spread over to the other rail. Hence, a key requirement for independence between the redundant rails is thereby fulfilled.

Rail Number Association

In accordance with an embodiment, the private InfiniBand or RoCE physical fabric configuration (as used herein, the term "fabric" or "private fabric" may refer to a private InfiniBand or RoCE based fabric) is defined in terms of a specific number of racks, each with a set of associated switches where each such associated switch has a specific role (Leaf or Spine).

In accordance with an embodiment well as access to the client network from the private fabric based system in smaller (e.g. quarter rack) configurations, a scheme is to "partition" the Leaf switches used to implement the private fabric into one physical partition (i.e. set of physical ports/connectors) that represents the private fabric, and another, non-overlapping partition that represents access to the client network (e.g. the on-premise data-center network). Hence, each such physically partitioned switch will have two non-overlapping sets of ports where only the set of ports that is dedicated to the private fabric will be allowed to represent connectivity within the private fabric (and vice versa).

In accordance with an embodiment, in the case of multi-rack configurations, there is typically no use of partitioned Leaf switches. Whereas, as indicated above, a single rack configuration may or may not use partitioned Leaf switches. Hence, the fabric definition in the case of single rack configuration will also include information about whether the Leaf switch configuration used is partitioned or not. However, smaller multi-rack configurations that are created based on expanding an existing single rack configuration may also use partitioned leaf switches within one or more racks.

In accordance with an embodiment, in order to support fabric configurations with two or more independent networks or "fabric rails" or simply "rails", then each switch will also be associated with a rail number. Hence, each such "rail" will then represent a topology of one or more switches with connectivity and traffic patterns that is independent of the other rails. (I.e. there is no link between a switch in one rail and another switch in another rail that is used for data traffic in the normal case.)

In accordance with an embodiment, a private fabric definition facilitates the following high level features:

The presence and availability of all defined switches can be automatically checked at run-time and exceptions can be reported immediately.

The configuration of each switch (and the local switch ports) can be automatically defined and verified according to its role and connectivity within the complete fabric.

The physical connectivity of the complete fabric can be verified according to pre-defined rules for each type of system.

Incorrect and/or degraded connectivity (i.e. misplaced cables and/or lack of sufficient number of links) between switches in the fabric can be detected and reported automatically while ensuring that no additional negative effects by preventing that incorrect connectivity is used for data traffic (e.g. in order to prevent potential packet forwarding loops or deadlocks).

A special case is scenarios where a link has been disabled due to high error rates Any connectivity between a defined switch within the private fabric and another switch or other network device that represents an un-expected device in the defined fabric can be reported and prevented from impacting the operation of the fabric.

In accordance with an embodiment, the basic fabric definition outlined above is focused on the switch topology and does not relate to the number and/or types of servers that are supposed to (or may) be part of the fabric. Hence, by default, any number of physical servers within the max numbers that the various fabric configuration types represent may be present in the fabric. Also, such servers can be added and removed dynamically without impacting the basic fabric definition. However, there is hardly any scenario where such private fabric based systems are very dynamic in the sense that physical servers are added, removed or replaced on a daily basis.—The physical configuration is typically expected to remain the same across weeks and months.

In accordance with an embodiment, based on that server configuration is expected to remain stable over significant periods of time, the fabric definition can optionally be extended with parameters defining the expected number and types of servers that are to be present in the system and/or within each rack.

In accordance with an embodiment, this extended fabric definition facilitates the following additional high level features:

The presence and availability (in terms of connectivity to the private fabric) of all defined servers can be automatically checked at run-time and exceptions can be reported immediately.

Presence (in terms of connectivity to the private fabric) of servers (types and/or numbers) not expected in the currently defined fabric configuration can be detected and reported immediately.

Additional policy can decide if unexpected server types or excessive numbers should be accepted for data traffic or not, but the default would be to "report and accept".

In the case of single rack configurations with partitioned Leaf switches, the connectivity observed between servers and the private fabric can be correlated with the connectivity observed between the corresponding servers and the client network (i.e. as long as policy exists for connectivity of servers to the client network).

Any servers that are connected to the client network but not to the private fabric can be identified (also the other way around for servers that are supposed to have client network connectivity).

In addition to connectivity between servers in the local rack and the client network, it is also possible to monitor up-link connectivity for the client network switch partitions.

Supported Fabric Topologies:

In accordance with an embodiment, in the case of "single-rail" systems, the supported topologies can be divided into two main classes:

Single Rack topology with two Leaf switches that are interconnected by a set of Inter Switch Links (ISLs)

In the case of no Leaf switch partitioning:

Depending on switch HW specific restrictions on packet buffer allocation and switch HW resource organization in general, there may be restrictions on which port numbers can be used for ISLs.

With Leaf switch partitioning:

The total set of switch ports is divided into the two partitions

Within the RoCE fabric partition, there may again be restrictions on which port numbers can be used for ISLs. (By default the same set of ports will be used for ISLs in both the partitioned and not partitioned Leaf switch case.)

For the client network partition there may also be restrictions or defaults for which ports will be used for local server connectivity and which ports will be used for up-links.

Multi Rack topologies (up to N racks) where each rack has at least two Leaf switches and where two or more Spine switches are located in independent racks.

Each Leaf switch in each rack has a set of Up-Links that are distributed among all the Spine switches in the fabric.

Depending on switch HW specific restrictions on packet buffer allocation and switch HW resource organization in general, there may be restrictions on which port numbers can be used for Up-Links.

Each Spine switch has a number of Down-Links that are distributed between all the Leaf switches in the fabric.

As long as Spine switches are only supposed to provide Down-Link connectivity, there is not supposed to be any difference in characteristics among different ports. However, since not all Spine ports may be utilized (connected) in a specific configuration, there may still be a reason for restricting which port numbers can be used for Down-Links.

In accordance with an embodiment, in the case of multi-rail topologies each individual fabric rail can correspond to either a single rack or a multi-rack topology as outlined above. However, within each rack, different leaf switches may belong to different rails, and the total set of spine switches may be divided between the defined rails. In order to increase the level of redundancy as well as bi-section bandwidth within each rail, the total number of switches across all rails in a multi-rail configuration may be higher than in a corresponding single-rail configuration.

In accordance with an embodiment, there are two main models for fabric rail independence: fully independent rails and semi-independent rails.

Fully independent rails:
  Each rail consists of an independent set of switches, and there is no connectivity between switch ports that belongs to different rails.
  Typical use case for this is with two or more dual-port adapters per server.
    In this case, each server can have redundant connectivity to each rail. Hence, no single point of failure in terms of a single adapter or a single adapter port for any server may lead to that the corresponding server is NOT able to send and receive data traffic on any fabric rail.
  If two servers do not both have connectivity to at least one common rail, then the pair of servers (or any pair of VMs—one on each of the pair of servers) can NOT belong to the same logical cluster where fabric based communication between the cluster nodes are required.
  In the case where non-overlapping sub-sets of adapters in each server are connected to non-overlapping sets of rails (i.e. there is no adapter that has ports connecting to more than one of the non-overlapping sets of rails), then the different rails are also independent in terms of communication protocols as well as software and firmware versions including both switch firmware, fabric management software, adapter firmware and adapter driver software.
Semi-independent rails:
  Each rail consists of an independent set of switches, and there is no connectivity between switch ports that belong to different rails that is used for data traffic in the normal case. However, "dormant" physical connectivity may exist between switches in different rails in order to be used to provide connectivity between pairs of servers that would otherwise not be able to communicate because they do not both have operational connectivity to the same rail.
  Typical use-case for this configuration is when each server typically has only a single dual port adapter where each adapter port is connected to a leaf switch in a different rail.
    In this case, any single port/link failure for any server will imply that it can NOT send or receive data traffic on the corresponding fabric rail.
  If two servers do not both have connectivity to at least one common rail, then either some of the "dormant" connectivity between switches in different rails can be utilized to re-establish connectivity between this particular pair of servers, or alternatively, the pair of servers (or any pair of VMs—one on each of the pair of servers) can not belong to the same logical cluster where fabric based communication between the cluster nodes are required.

In accordance with an embodiment, each switch can have persistent knowledge about the fabric type it belongs to as well as its own role and rail association in the fabric.

In accordance with an embodiment, each switch can have persistent knowledge about the identity, roles and rail association of all other switches in the defined fabric.

In accordance with an embodiment, each switch can be able to reflect its fabric related configuration info via exported LLDP type information to directly connected peer ports.

In accordance with an embodiment, each leaf switch in a single rack fabric can have a-priori knowledge about required ISL connectivity (if any) to the other leaf switch.

In accordance with an embodiment, each partitioned leaf switch in a single rack fabric can keep track of which ports belongs to which partition and reflect the partition type as part of exported LLDP type information.

In accordance with an embodiment, each leaf switch in a multi-rack fabric can have a-priori knowledge about required Up-Link connectivity to the spine switches in the fabric.

In accordance with an embodiment, each spine switch in a multi-rack fabric can have a-priori knowledge about required Down-Link connectivity to the leaf switches in the fabric.

In accordance with an embodiment, each switch can be able to determine neighbor connectivity for each operational switch port without enabling any data traffic through the port.

In accordance with an embodiment, each switch can be able to dynamically determine if discovered neighbor connectivity represents legal connectivity for this switch, and if so, how the local port should be configured.

In accordance with an embodiment, each switch can be able to dynamically configure a switch port according to the a-priori rules for the relevant legal connectivity and also synchronize this configuration with the relevant peer port prior to allowing data traffic through the port.

In accordance with an embodiment, each switch can dynamically share its physical neighbor connectivity with all other switches in the fabric.

In accordance with an embodiment, each switch can monitor its ability to communicate with any other defined switch on the management network.

In accordance with an embodiment, each switch can dynamically share the list of other switches it is able to communicate with to all the other switches in the fabric.

In accordance with an embodiment, each switch should provide log info reflecting changes in physical connectivity along with the status of such connectivity in terms of legal, incorrect or degraded, as well as changes in ability to communicate with other switches in the fabric on the management network.

In accordance with an embodiment, at the fabric level, there should be coordinated logging and event reporting about fabric level connectivity issues including lack of management connectivity between pairs/sets of switches as well as complete loss of reachability for a specific switch from the rest of the fabric.

In accordance with an embodiment, critical events like unexpected loss of fabric level contact with a specific switch (i.e. for more than an expected reboot period) should be supported as Automatic Service Requests (ASRs).

In accordance with an embodiment, a Leaf switch can monitor physical server connectivity according to policy (if present) about expected and required server presence and connectivity in the fabric.

In accordance with an embodiment, a partitioned Leaf switch should be able to monitor client network connectivity to servers according to policy (if present) about expected and required server presence in the fabric.

In accordance with an embodiment, in the case of multi-rail fabric configurations, each switch can ensure that all normal connectivity is between switches that belong to the same rail.

In accordance with an embodiment, in the case of semi-independent multi-rail fabric configurations, any physical connectivity between switches in different rails must be verified to be in accordance with required inter-rail connectivity, and this connectivity should then not be used for data traffic in the normal case.

Fabric Connectivity Checking for different switch Roles and Topologies:

In accordance with an embodiment, each individual switch can verify that it has correct connectivity according to its role and the type of fabric configuration/topology it belongs to:

Partitioned Leaf switch in single rack, single rail configuration:
  There should be at least N1-1 ports in the switch partition that represent ISLs.
    If there are restrictions on which port numbers can be used as ISLs, then all ports that represents ISLs must be within the relevant set of ports.
    There should be at most N1-2 ISLs.
  There can be at most N2 ports in the switch partition that connect to host adapter ports.
  Each ISL must connect to a single remote switch that has Leaf switch role, that is partitioned, where the peer port is configured as ISL and where the remote switch belongs to the same single fabric instance.

Leaf switch (not partitioned) in single rack, single rail configuration:
  There should be at least N3-1 ports that represent ISLs.
    If there are restrictions on which port numbers can be used as ISLs, then all ports that represents ISLs must be within the relevant set of ports.
    There should be at most N3-2 ISLs
  There can be at most N4 ports that connect to host adapter ports.
  Each ISL must connect to a single remote switch that has Leaf switch role, that is not partitioned, where the peer port is configured as ISL and where the remote switch belongs to the same single fabric instance.

Leaf switch in multi rack, single rail configuration:
  There should be at least N5-1 ports that represent Up-Links.
    If there are restrictions on which port numbers can be used as Up-Links, then all ports that represent Up-Links must be within the relevant set of ports.
    There should be at most N5-2 Up-Links
  There can be at most N6 ports that connect to host adapter ports.
  Each Up-Link must connect to a switch that has Spine switch role and that belongs to the same single fabric instance.
  There must be Up-Link connectivity to each Spine switch defined for the fabric instance.
  The set of Up-Links must be evenly divided between all the Spine switches defined for the fabric instance.

Spine switch in multi rack, single rail configuration:
  All connected ports should represent Down-Links to Leaf switches defined to be part of the same fabric instance.
    If there are restrictions on which port numbers can be used as Down-Links, then all ports that represents Down-Links must be within the relevant set of ports.
  There should be no ports that connect to host ports.
  There can be at least one Down-Link connecting each Leaf switch defined for the fabric instance.
  The set of Down-Links must be evenly divided between all the Leaf switches defined for the fabric instance.

In accordance with an embodiment, for multi-rail fabric configurations, the connectivity rules are the same as for the single-rail configurations above, but with the additional rule that all such connectivity must belong to the same rail. Hence, in single rack cases with only two leaf switches, the requirement may be that no ISLs should be connected at all (fully independent rails), or that such ISLs should represent "dormant connectivity" (semi-independent rails).

In accordance with an embodiment, in terms of server connectivity, the connectivity checking can ensure that individual servers have redundant connectivity to the fabric according to defined single or multi-rail policies.

In accordance with an embodiment, connectivity that is not in accordance with the above rules will be recorded and reported and will not be enabled for data traffic.

In accordance with an embodiment, missing connectivity will be recorded and reported and the involved switches (or servers) will be considered as having degraded (or incomplete) connectivity.

In accordance with an embodiment, valid connectivity will be used to implement data traffic in the fabric according to defined configuration and routing/forwarding policies for the relevant topology within either a single or multiple fabric rails.

Implementation:

In accordance with an embodiment, the Physical Fabric Connectivity Control implementation has the following components:
  The switch based Local Link Monitoring (LLM) daemon that keeps track of local link state, remote connectivity (if any) as well as local traffic and error counters.
  The switch based Physical Connectivity Control (PCC) daemon that receives local in-band fabric connectivity information from the LLM and based on this determines if local connectivity is in accordance with requirements for this switch instance (relative to its role in the overall fabric configuration) and if so, what high level configuration type to apply for the relevant switch ports.
  The Hardware (HW) Configuration Daemon (HWCD) that configures the switch and switch ports (using switch HW platform specific interfaces) according to the high level configuration types provided by the PCC for the switch and each connected port with validated remote connectivity.
  The Fabric Availability and Synchronization daemon (FAS) that synchronizes fabric configuration information and associated policies among all the defined switches in the fabric. The FAS also keeps track of reachability on the management network for all defined switches in the fabric and coordinates distribution of information between the PCC instances on each switch.

In accordance with an embodiment, based on the currently defined persistent fabric configuration information and role information for the local switch, the PCC constantly evaluates the current local connectivity by correlating the neighbor connectivity information received from the LLM with the expected connectivity defined by the configuration and role information and the a-priori connectivity rules.

In accordance with an embodiment, since all recently trained links by default will not have data traffic enabled, any connectivity that is not in accordance with relevant rules will be left in this state. However, whenever the connectivity is in accordance with relevant rules, the PCC will instruct the HWCD to configure and enable the port according to the determined legal link type (i.e. host link, ISL, Up-Link or Down-Link).

In accordance with an embodiment, when a newly trained link has been evaluated by the PCC, the relevant connectivity information is distributed to all other PCCs on all other switches in the fabric via the FAS.

In accordance with an embodiment, the FAS on all switches in the fabric will constantly monitor if all other switches are reachable on the management network and report current status to the current master FAS.

In accordance with an embodiment, the PCC that is co-located with the Master FAS will at any point in time evaluate the complete set of in-band and management network connectivity information from both its fellow PCC instances as well as the FASes. Based on this evaluation and based on defined timeout periods for lack of connectivity or reachability, the Master PCC will generate alarm events and relevant ASRs.

Figure 19:
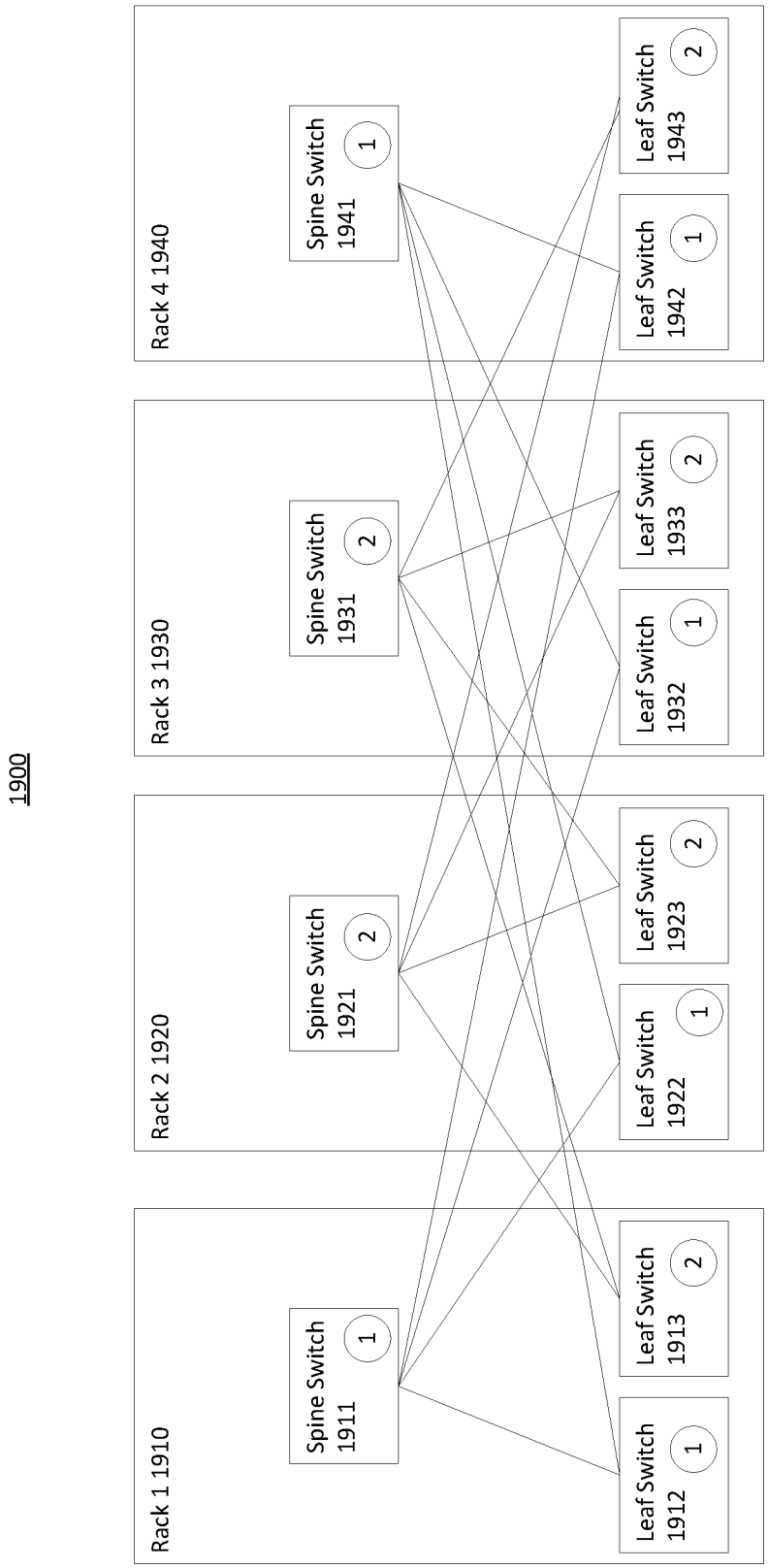
FIG. 19 shows a system for supporting rail number association for correct connectivity in a high performance computing environment, in accordance with an embodiment.

FIG. 19 shows a system for supporting rail number association for correct connectivity in a high performance computing environment, in accordance with an embodiment.

In accordance with an embodiment, in system 1900, a number of racks are supported, including rack 1 1910, rack 2 1920, rack 3 1930, and rack 4 1940. Each of the racks can support a number of switches, both leaf switches (i.e., those switches that are directly connected to HCAs (not shown), as well as a number of spine switches (each switch that is not a leaf switch). These include leaf switches 1912-13, 1922-23, 1932-33, and 1942-43, as well as spine switches 1911, 1921, 1931, and 1941.

In accordance with an embodiment, the system 1900 is a multi-rail topology where each rail represents a different fabric. In the system displayed in FIG. 19, there are two independent rails, namely rail 1 and rail 2 (indicated in the figure).

In accordance with an embodiment, to support fabric configurations with two or more independent networks or "fabric rails" or simply "rails", then each switch will also be associated with a rail number (e.g., 1 and 2 as shown). Each such "rail" will then represent a topology of one or more switches with connectivity and traffic patterns that is independent of the other rails. (i.e., there is no data link between a switch in one rail and another switch in another rail that is used for data traffic in the normal case.) (There can, however, be inter-rail links for management traffic).

In accordance with an embodiment, the rails depicted are fully independent rails in that each rail consists of an independent set of switches, and there is no connectivity between switch ports that belongs to different rails. Typical use case for this is with two or more dual-port adapters per server. In this case, each server (not shown) can have redundant connectivity to each rail. Hence, no single point of failure in terms of a single adapter or a single adapter port for any server may lead to that the corresponding server is not able to send and receive data traffic on any fabric rail.

In accordance with an embodiment, if two servers do not both have connectivity to at least one common rail, then the pair of servers (or any pair of VMs—one on each of the pair of servers) cannot belong to the same logical cluster where fabric based communication between the cluster nodes are required.

In accordance with an embodiment, in the case where non-overlapping sub-sets of adapters in each server are connected to non-overlapping sets of rails (i.e. there is no adapter that has ports connecting to more than one of the non-overlapping sets of rails), then the different rails are also independent in terms of communication protocols as well as software and firmware versions including both switch firmware, fabric management software, adapter firmware and adapter driver software.

Heterogeneous and Asymmetric Dual Rail Configuration

In accordance with an embodiment, systems using a private RDMA fabric for communication related to various types of high performance computing (HPC) as well as for high-performance, highly available databases and other data services, can, in most cases, also have connectivity to a different network that, for example, is used for client access or for access to resources external to the system—including resources on the overall Internet.

In accordance with an embodiment, for example, a special case of such systems is cloud based systems where the overall cloud may include tens of thousands of servers (i.e., hundreds to thousands of server racks) connected via a global cloud network. Within the overall cloud, smaller islands or PODs (point of delivery) (e.g. sets of 8-32 server racks in close proximity) may exist where the servers are also interconnected by a high-performance RDMA fabric based on either RoCE, InfiniBand or other implementations of high performance RDMA. In accordance with an embodiment, a POD can mean a module of network, compute, storage, and application components that work together to deliver networking services. A POD can comprise, for example, a number of racks, servers, switches, networks, and infrastructures. PODs can be designed to be rolled in, connected, and be up and running right away. A POD can comprise, for example, a complete data center, or it can also represent a granular unit of expansion in a larger installation.

In accordance with an embodiment, traditionally, the performance of a global cloud network is been inferior relative to what can be achieved via a high-performance dedicated RDMA fabric. This is partly due to that the basic link speeds in the cloud network may be lower than what is provided in a dedicated RDMA fabric (e.g. 25 Gb/s versus 100 Gb/s), but also—and in particular—due to that the strict rules for access control and firewall rule enforcement within the cloud network implies schemes with state-full firewall processing of each individual network packet leading to lower overall packet rates from/to each node as well as significantly increased message latency between communicating nodes. However, as "state of the art" link speed increases, and the integration level for on-chip logical functions increases in every new hardware generation, it becomes increasingly more likely that workloads that typically have depended on communication via a dedicated, private RDMA fabric will also be able to make use of a cloud network for RDMA based communication with "reasonable" performance.

In accordance with an embodiment, another aspect of such networks is scalability in terms of number of nodes that can communicate effectively as well as how flexible nodes for a particular distributed workload can be allocated. A key benefit with the global cloud network is that it allows any node to communicate with any other node and hence provides ultimate node allocation flexibility. However, such global connectivity also implies long distances in terms of number of switch hops which increases message latency in the normal case and that may also increase the risk of reduced performance due to congestion between different flows within the network. Hence, in order to reduce message latency and risk of congestion between independent workloads, a node allocation algorithm for distributed workloads can normally try to allocate nodes in adjacent parts of the network (i.e. adjacent in terms of number of switch hops).

In accordance with an embodiment, however, as a result of the ever increasing level of integration of logic on a single chip, currently, more than a hundred 100 Gb/s ports interconnected by a non-blocking full crossbar can be provided as a single switch chip. Hence, the number of nodes that can communicate within a distance of only three switch hops in a fully non-blocking fat-tree topology is in the order of several thousands. As a result, very large PODs within the cloud can be constructed where there is a cloud network as well as private RDMA fabric connectivity between all servers in a POD, and where the maximum distance between any such servers is just three switch hops.

In accordance with an embodiment, while a cloud network infrastructure may become usable also for workloads using high-performance RDMA communication, it is likely that a private, dedicated RDMA fabric can still have non-trivial performance advantages. Hence, the use of a private RDMA fabric within individual PODs in a cloud can provide an auxiliary, higher performance communication infrastructure in addition to the cloud network, which can make sense for many workloads.

In accordance with an embodiment, a POD where the servers are connected by both the cloud network as well as by a private RDMA fabric can in principle be viewed as an example of a "fully independent dual rail" configuration where the cloud network as well as the private RDMA fabric each may represent either a single rail, or potentially also a semi-independent or even fully independent dual rail configuration. However, a traditional highly available configuration where each server has dual ports connecting to a single switched network infrastructure with dual leaf switches and a shared spine switch infrastructure may be a typical scenario. Still, due to cost constraints as well as complexity in terms of number of switches and cables to provide even redundant server connectivity within each such rail, it is also possible that each such rail is implemented in a non-redundant manner where the servers have one adapter and single port connecting to the cloud network and another adapter and single port connecting to the private RDMA fabric.

In accordance with an embodiment, then, the cloud network and the private RDMA fabric represent a heterogeneous and asymmetric dual rail configuration: They both represent full connectivity to all servers in the POD (i.e., in the non-degraded case), and they can both implement relevant RDMA based communication between any pair of servers in the POD, but the best case communication performance may not be identical between the two rails. In the typical case, the private RDMA fabric may provide the best (expected) performance and will therefore be the primary choice for RDMA based communication within the POD.

In accordance with an embodiment, however, the cloud network may be selected also for RDMA based communication in, for example, the following potential scenarios: a) when a pair of nodes that needs RDMA based communication is not able to communicate on the private RDMA fabric; b) when a RDMA based communication is required between nodes that belong to different PODs; c) when a current, relevant load on a private RDMA fabric is high (enough) and the current, relevant load on the cloud network is low (enough) so that the effective communication performance between a pair of nodes within a single POD is better on the cloud network than on the private RDMA fabric; or d) when a SLA (Service Level Agreement) for the relevant workload indicates that use of the premium communication service provided by the private RDMA fabric is not required or not allowed.

In accordance with an embodiment, an implementation of an asymmetric dual rail system comprises various management modules. These can include, for example, a distributed workload placement orchestrator (DWPO), and a connection and rail selection manager (CRSM), a. A DWPO is typically a part of the overall cloud workload management infrastructure and is responsible for assigning the individual logical nodes in the distributed workload to physical nodes in the cloud/data-center. A logical node may be implemented as a container within the physical node OS, a virtual machine controlled by a hypervisor on the physical node, or as bare metal OS/system image on the physical node.

In accordance with an embodiment, a DWPO can use placement policy information associated with the workload in order to decide if placement within a single POD is required (or desired) and if so, what kind of adjacency is required (or desired) between the various pairs of logical nodes within the workload. Adjacency parameters and requirements can include latency goals as well as expected traffic patterns and volumes.

In accordance with an embodiment, based on correlating the placement policy information for the workload with the current level of utilization and SLAs associated with existing workloads, the DWPO can determine either a best effort or a placement according to a strict SLA for the workload being orchestrated. In some cases, this can imply that existing workloads are re-organized. The placement of the new workload as well as the potential re-organization of existing workloads may include a single POD or multiple PODs as well as PODs with private RDMA fabric or without private RDMA fabric depending on available resources as well as relevant SLA requirements.

In accordance with an embodiment, a CRSM has one centralized component that is an integral part of the overall cloud workload management infrastructure and another component that is integrated with the communication runtime system in every logical node.

In accordance with an embodiment, a CRSM, which can be centralized, can cooperate with the DWPO in order to determine connection policies for the various logical nodes within a distributed workload in terms of primary rail selection and connection parameter policies relative to the peer logical nodes that each logical node is supposed to communicate with. In the simplest case this policy can be to use default parameters and use a preferred rail (i.e. typically the private RDMA fabric when present) as long as this rail provides connectivity for the relevant peer node. In a more complex scenario, individual or groups of logical node pairs may have explicit rail selection policies and connection parameter policies for each direction.

Figure 20:
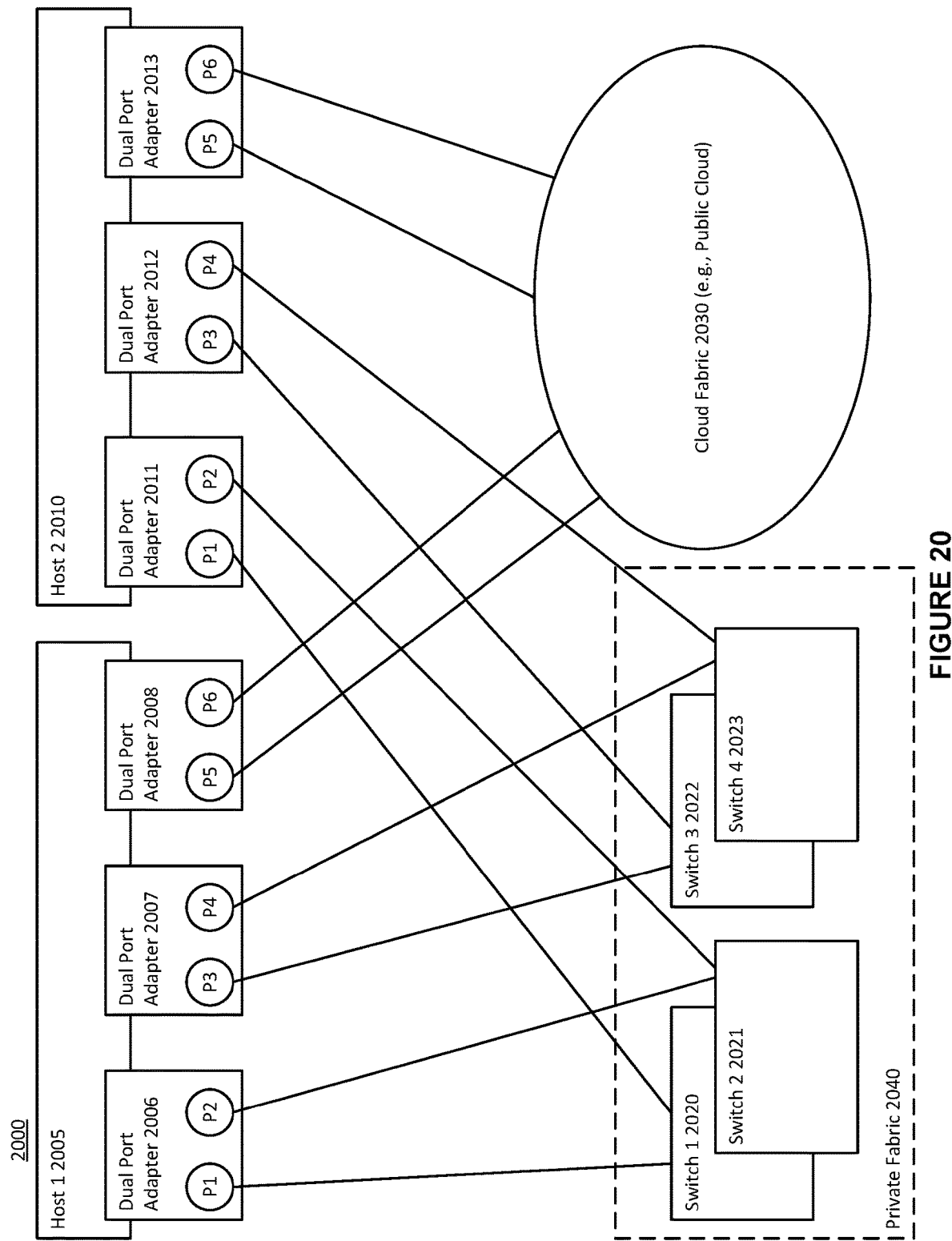
FIG. 20 shows a system for supporting a heterogeneous and asymmetric dual-rail fabric configuration, in accordance with an embodiment.

In accordance with an embodiment, each per logical node CRSM instance will use policy information from the central CRSM in order to establish and maintain relevant connections with relevant peer nodes. The node local CRSM instances will also be able to adapt connection setup for individual peer nodes according to currently available connectivity and load on the relevant rails and in accordance with the SLA constraints that exists for the workload as a whole and for communication with the relevant individual peer nodes FIG. 20 shows a system for supporting a heterogeneous and asymmetric dual-rail fabric configuration, in accordance with an embodiment.

In accordance with an embodiment, within a system 2000, a number of host nodes, such as host node 1 2005 and host node 2 2010 can be supported. Each of the host nodes can comprise a number of dual port adapters (e.g., dual port network adapters), such as dual port adapters 2006, 2007, and 2008 on host node 1, and dual port adapters 2011, 2012, and 2013 on host node 2. Each dual port adapter can provide two ports by which the host node can be connected to one or more networks, such as private fabric 2040 and cloud fabric 2030, such as a public cloud. As shown, the private fabric 2040 comprises, for example, two sets of overlapping switches, switch 1 2020 and switch 2 2021, and switch 3 2022 and switch 4 2023, where such pairs of switches represent fully independent rails within the private fabric.

In accordance with an embodiment, each of the host nodes can each comprise a plurality of dual port adapters. For example, in the embodiment shown, each host node supports three dual port adapters. Of these three dual port adapters, two of the dual port adapters on each host node can be connected to the private fabric 2040, leaving one adapter to be connected to the cloud fabric 2030. In this way, each host node can be connected via the private fabric with two fully independent rails (i.e., switch 1 and switch 2, and switch 3 and switch 4, wherein each pair of overlapping switches represents a fully independent rail), and via the cloud fabric as well.

If needed, modified versions of this drawing can be replicated multiple times (e.g. "medium" and "small) below) to show that the private fabric can itself be both semi-independent and fully independent and also that host connectivity can vary from single adapter with one port connected to cloud and one port connected to private fabric to multiple dual port adapters with different adapters connecting different fully independent rails in the private fabric as well as multiple adapters connecting the cloud.

In accordance with an embodiment, depending upon the type of traffic flow within the network, a determination that any given packet should utilize the private fabric can be made. Within the private fabric, two fully independent rails are provided, where each rail can be connected to a separate dual port adapter at the host nodes. In some embodiments, the private fabric provides higher, and safer performance than the cloud fabric, but generally has fewer resources, thus making flow within the private fabric more expensive.

In accordance with an embodiment, the private fabric is fully controlled and redundant. On the other hand, because of the nature of the cloud fabric, it is generally considered to not be fully controlled, but it may provide redundant connectivity. In accordance with an embodiment, then, having the at least two fabrics (private and public) provides an asymmetric scheme where two adapters in each host represent fully redundant connectivity to two rails in the private fabric, where a third adapter provides some (potentially redundant) connectivity within the public cloud. By having redundant connectivity to the cloud, this provides an alternative option to traffic flow between the hosts.

In accordance with an embodiment, a workload (e.g., comprise a plurality of virtual machines implemented, for example, on the two host nodes depicted in FIG. 20, and deployed and configured in such a manner that the VMs can communicate with each other) can be deployed within the environment depicted in FIG. 20. For a given workload, a policy can be associated with the deployed workload (e.g., a "gold card" workload policy that dictates that packets of such a workload should utilize a high-level private RDMA fabric, or, e.g., an "economy" workload policy that dictates that packets of such a workload utilize whichever bandwidth is available (e.g., private if available, but public cloud otherwise)). Accordingly, these different workload policies can be taken into account when determining which types of connectivity should be used for any give workload in the system. For example, if a first workload comprises a high, "gold card" workload policy, then packets within that workload would likely be allocated and provisioned strictly within the private fabric. Alternatively, if another workload comprises a lower, "economy" workload policy, then packets associated with such a workload could attempt to utilize the private fabric, but could also utilize the public cloud for connectivity.

Figure 21:
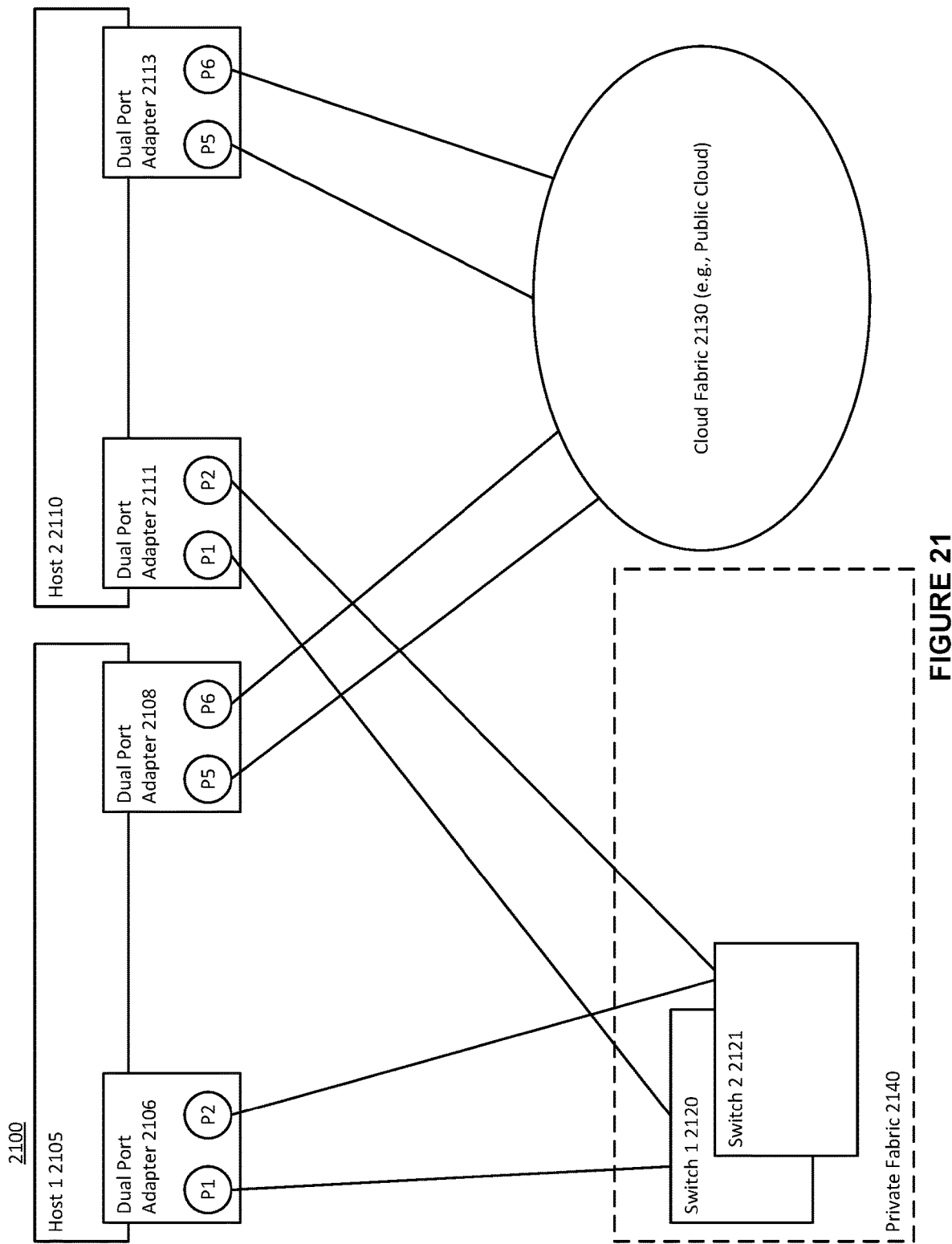
FIG. 21 shows a system for supporting a heterogeneous and asymmetric dual-rail fabric configuration, in accordance with an embodiment.

FIG. 21 shows a system for supporting a heterogeneous and asymmetric dual-rail fabric configuration, in accordance with an embodiment.

In accordance with an embodiment, within a system 2100, a number of host nodes, such as host node 1 2105 and host node 2 2110 can be supported. Each of the host nodes can comprise a number of dual port adapters (e.g., dual port network adapters), such as dual port adapters 2106, and 2108 on host node 1, and dual port adapters 2111, and 2113 on host node 2. Each dual port adapter can provide two ports by which the host node can be connected to one or more networks, such as private fabric 2140 and cloud fabric 2130, such as a public cloud. As shown, the private fabric 2140 comprises, for example, a set of overlapping switches, switch 1 2120 and switch 2 2121, where each switch represent semi independent rails within the private fabric 2140.

In accordance with an embodiment, each of the host nodes can each comprise a plurality of dual port adapters. For example, in the embodiment shown, each host node supports two dual port adapters. Of these two dual port adapters, one of the dual port adapters on each host node can be connected to the private fabric 2140, leaving the other adapter to be connected to the cloud fabric 2130. In this way, each host node can be connected via the private fabric with two semi independent rails (i.e., switch 1 and switch 2), and via the cloud fabric as well.

Figure 22:
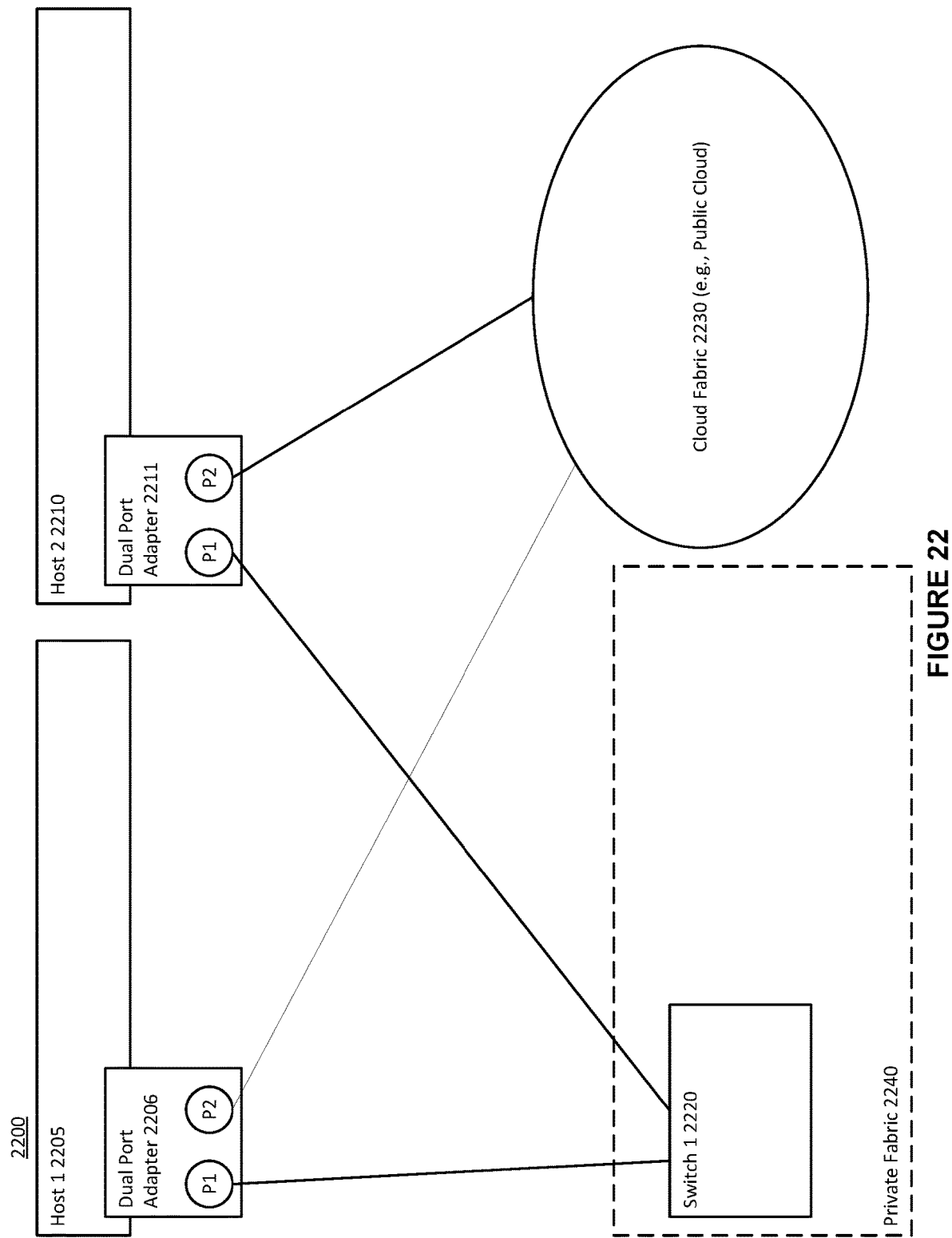
FIG. 22 shows a system for supporting a heterogeneous and asymmetric dual-rail fabric configuration, in accordance with an embodiment.

FIG. 22 shows a system for supporting a heterogeneous and asymmetric dual-rail fabric configuration in accordance with an embodiment.

In accordance with an embodiment, within a system 2200, a number of host nodes, such as host node 1 2205 and host node 2 2210 can be supported. Each of the host nodes can comprise a number of dual port adapters (e.g., dual port network adapters), such as dual port adapters 2206 on host node 1, and dual port adapter 2211 on host node 2. Each dual port adapter can provide two ports by which the host node can be connected to one or more networks, such as private fabric 2240 and cloud fabric 2230, such as a public cloud. As shown, the private fabric 2240 comprises, for example, a switch 2220, where the switch represents a single rail within the private fabric 2240.

In accordance with an embodiment, each of the host nodes can each comprise a plurality of dual port adapters. For example, in the embodiment shown, each host node supports one dual port adapter. Within this dual port adapter, one port can be connected to the private fabric, representing one rail, while the other can be connected via the cloud fabric, representing another rail.

Figure 23:
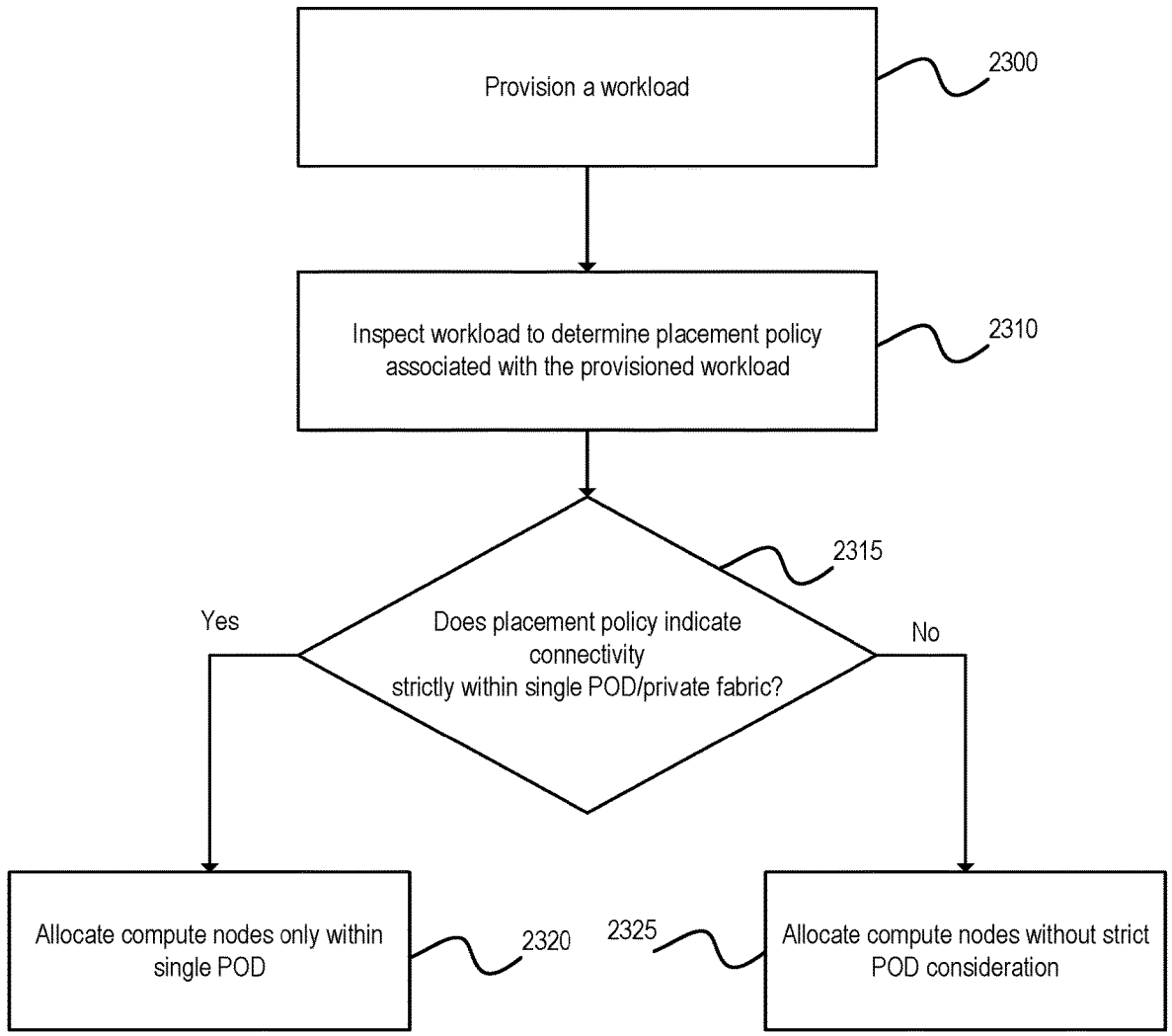
FIG. 23 is a flowchart of a method for determining a placement policy for a provisioned workload, or being provisioned, within a system for supporting a heterogeneous and asymmetric dual-rail fabric configuration.

FIG. 23 is a flowchart of a method for determining a placement policy for a provisioned workload, or being provisioned, within a system for supporting a heterogeneous and asymmetric dual-rail fabric configuration. In accordance with an embodiment, a workload can comprise a number of hosts, wherein the hosts can comprise a number of physical hosts and/or a number of virtual machines.

In accordance with an embodiment, at step 2300, a provisioned workload (a workload having already been provisioned, or a workload being provisioned) can be provided.

In accordance with an embodiment, at step 2310, the workload can be inspected to determine a placement policy associated with the provisioned workload.

In accordance with an embodiment, at step 2315, the method can determine whether the placement policy of the workload specifies strict connectivity within a single POD.

In accordance with an embodiment, at step 2320, if the placement policy so directs strict placement within a single POD, then compute nodes within the single pod can be allocated to the provisioned workload.

In accordance with an embodiment, at step 23250, if the placement policy does not direct strict placement within a single POD, then compute nodes can be allocated to the workload without POD consideration.

Figure 24:
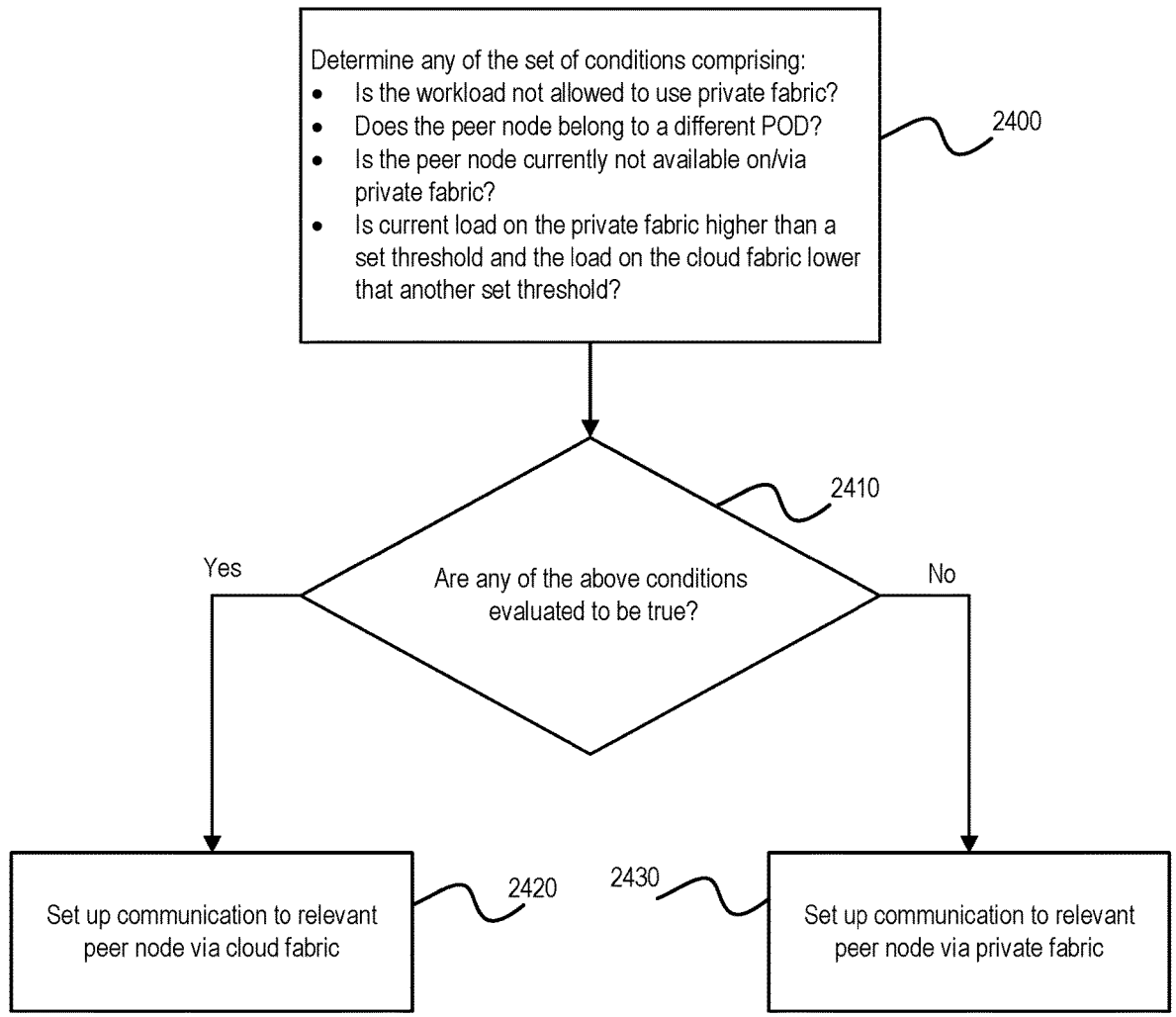
FIG. 24 is a flowchart of a method for determining selection of fabric type for a provisioned workload, or a workload being provisioned, in accordance with an embodiment.

FIG. 24 is a flowchart of a method for determining selection of fabric type for a specific communication within a provisioned workload, or a workload being provisioned, in accordance with an embodiment.

At step 2400, in accordance with an embodiment, the method can determine whether any of the set of conditions are met, wherein the set of conditions comprises: 1) is the workload prohibited from using a private fabric?; 2) Does the peer (i.e., target) node belong to a different POD?; 3) Is the peer node currently not available on/via private fabric?; and 4) Is current load on the private fabric higher than a set threshold and the load on the cloud fabric lower that another set threshold?

In accordance with an embodiment, at 2410, the method can determine if any of the conditions of step 2400 are true.

In accordance with an embodiment, if one or more of the conditions of step 2400 are true, then the method can set up communication to the target node (peer node) via a cloud fabric, at step 2420.

In accordance with an embodiment, if none of the conditions of step 2400 are true, then the method can set up communication to the target node (peer node) via a private fabric, at step 2430.

Figure 25:
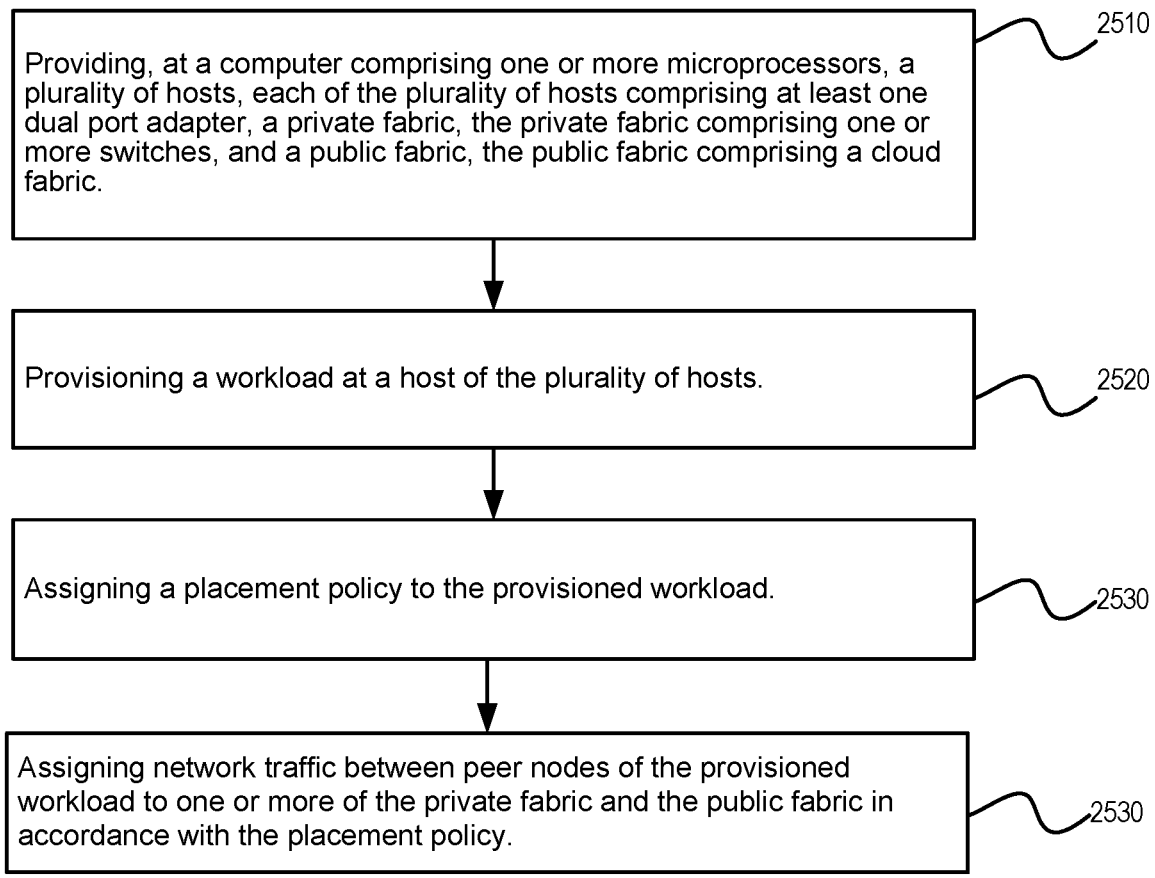
FIG. 25 is a flowchart of a method for supporting a heterogeneous and asymmetric dual-rail fabric configuration, in accordance with an embodiment.

FIG. 25 is a flowchart of a method for supporting a heterogeneous and asymmetric dual-rail fabric configuration, in accordance with an embodiment.

At step 2510, the method can provide, at a computer comprising one or more microprocessors, a plurality of hosts, each of the plurality of hosts comprising at least one dual port adapter, a private fabric, the private fabric comprising two or more switches, and a public fabric, the public fabric comprising a cloud fabric.

At step 2520, the method can provision a workload at a host of the plurality of hosts.

At step 2530, the method can assign a placement policy to the provisioned workload.

At step 2540, the method can assign network traffic between peer nodes of the provisioned workload to one or more of the private fabric and the public fabric in accordance with the placement policy.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting redundant independent networks in a high performance computing environment, comprising:
    a computer, the computer comprising one or more microprocessors;
    a plurality of hosts provided at the computer;
    wherein a host of the plurality of hosts is connected, by a first host port, to a private network fabric, wherein the host is further connected, via a second host port, to a public cloud network, and wherein the private network fabric and the public cloud network each respectively comprise an independent rail;
    wherein a workload is provisioned at the host of the plurality of hosts, the host of the plurality of hosts being respectively connected to each independent rail via a different port of a plurality of ports associated with the host;
    wherein the workload is assigned to one of the private network fabric and the public cloud network.

2. The system of claim 1,
    wherein the private network fabric independently provides full connectivity between the plurality of hosts.

3. The system of claim 2,
    wherein the public cloud network independently provides full connectivity between the plurality of hosts.

4. The system of claim 3,
    wherein the assignment of the workload to one of the private network fabric and the public cloud network is based on a service level agreement associated with the workload.

5. The system of claim 4,
    wherein the private network fabric comprises a plurality of switches.

6. The system of claim 5,
    wherein, based upon the service level agreement associated with the workload, communication associated with the workload between the plurality takes place within the public cloud network.

7. The system of claim 5,
    wherein, based upon the service level agreement associated with the workload, communication associated with the workload between the plurality takes place within the private network fabric.

8. A method for supporting redundant independent networks in a high performance computing environment, comprising:
    providing, at a computer, the computer comprising one or more microprocessors,
    a plurality of hosts;
    wherein a host of the plurality of hosts is connected, by a first host port, to a private network fabric,
    wherein the host is further connected, via a second host port, to a public cloud network, and
    wherein the private network fabric and the public cloud network each respectively comprise an independent rail;
    wherein a workload is provisioned at a host of the plurality of hosts, the host of the plurality of hosts being respectively connected to each independent rail via a different port of a plurality of ports associated with the host;
    wherein the workload is assigned to one of the private network fabric and the public cloud network.

9. The method of claim 8,
    wherein the private network fabric independently provides full connectivity between the plurality of hosts.

10. The method of claim 9,
    wherein the public cloud network independently provides full connectivity between the plurality of hosts.

11. The method of claim 10,
    wherein the assignment of the workload to one of the private network fabric and the public cloud network is based on a service level agreement associated with the workload.

12. The method of claim 11,
    wherein the private network fabric comprises a plurality of switches.

13. The method of claim 12,
    wherein, based upon the service level agreement associated with the workload, communication associated with the workload between the plurality takes place within the public cloud network.

14. The method of claim 13,
    wherein, based upon the service level agreement associated with the workload, communication associated with the workload between the plurality takes place within the private network fabric.

15. A non-transitory computer readable storage medium comprising instructions for supporting redundant independent networks in a high performance computing environment, comprising:
providing, at the computer, the computer comprising one or more microprocessors,
a plurality of hosts;
wherein a host of the plurality of hosts is connected, by a first host port, to a private network fabric, wherein the host is further connected, via a second host port, to a public cloud network, and wherein the private network fabric and the public cloud network each respectively comprise an independent rail;
wherein a workload is provisioned at a host of the plurality of hosts, the host of the plurality of hosts being respectively connected to each independent rail via a different port of a plurality of ports associated with the host;
wherein the workload is assigned to one of the private network fabric and the public cloud network.

16. The non-transitory computer readable storage medium of claim 15,
wherein the private network fabric independently provides full connectivity between the plurality of hosts.

17. The non-transitory computer readable storage medium of claim 16,
wherein the public cloud network independently provides full connectivity between the plurality of hosts.

18. The non-transitory computer readable storage medium of claim 17,
wherein the assignment of the workload to one of the private network fabric and the public cloud network is based on a service level agreement associated with the workload.

19. The non-transitory computer readable storage medium of claim 18,
wherein the private network fabric comprises a plurality of switches.

20. The non-transitory computer readable storage medium of claim 19,
wherein, based upon the service level agreement associated with the workload, communication associated with the workload between the plurality takes place within the public cloud network; and
wherein, based upon the service level agreement associated with the workload, communication associated with the workload between the plurality takes place within the private network fabric.

* * * * *